(12) United States Patent
Perrault et al.

(10) Patent No.: US 6,769,981 B1
(45) Date of Patent: Aug. 3, 2004

(54) HOP VINE PROCESSOR

(76) Inventors: Kenneth J. Perrault, 5700 Beauchene Rd., Moxee, WA (US) 98936; Charles J. Perrault, 5905 Beauchene Rd., Moxee, WA (US) 98936

( * ) Notice: Subject to any disclaimer, the term of this patent is extended or adjusted under 35 U.S.C. 154(b) by 0 days.

(21) Appl. No.: 10/192,461

(22) Filed: Jul. 9, 2002

(51) Int. Cl.[7] ............................................. A01D 46/02
(52) U.S. Cl. ..................................... 460/126; 460/123
(58) Field of Search ............................. 460/123, 126, 460/134, 135, 138

(56) References Cited

U.S. PATENT DOCUMENTS

| | | | |
|---|---|---|---|
| 744,328 A | | 10/1903 | Frtschek ..................... 241/262 |
| 2,587,604 A | * | 3/1952 | Dauenhauer ................ 460/126 |
| 2,681,066 A | * | 6/1954 | Dauenhauer ................ 460/125 |
| 2,685,966 A | * | 8/1954 | Dauenhauer ................ 209/692 |
| 2,757,785 A | | 8/1956 | Dauenhauer ............. 198/803.3 |
| 3,316,916 A | | 5/1967 | Dauenhauer et al. ....... 460/126 |
| 3,385,336 A | | 5/1968 | Barnard .......................... 83/52 |
| 3,594,995 A | * | 7/1971 | Soules et al. ................ 56/10.7 |
| 3,597,905 A | * | 8/1971 | Jarrell .......................... 56/11.9 |
| 3,741,051 A | | 6/1973 | Brooks et al. ................. 83/23 |
| 3,927,680 A | * | 12/1975 | Stefan et al. ............... 460/128 |
| 3,962,851 A | * | 6/1976 | Liepold et al. ............... 56/126 |
| 4,142,686 A | | 3/1979 | Houle ..................... 241/101.78 |
| 4,229,932 A | | 10/1980 | Persoons et al. ............. 56/13.5 |
| 4,276,738 A | * | 7/1981 | Ferraro ......................... 56/130 |
| 4,603,816 A | | 8/1986 | Panning ....................... 241/266 |
| 5,025,992 A | | 6/1991 | Niebur ................... 241/101.76 |
| 5,033,684 A | | 7/1991 | Heide ...................... 241/101.7 |
| 5,333,799 A | | 8/1994 | Posthumus ................... 241/27 |
| 5,573,190 A | | 11/1996 | Goossen ...................... 241/27 |
| 5,575,427 A | | 11/1996 | Karpisek ..................... 241/30 |
| 6,086,001 A | | 7/2000 | Patterson ..................... 241/27 |

FOREIGN PATENT DOCUMENTS

RU  2119737 C1 * 10/1998

* cited by examiner

Primary Examiner—Thomas B. Will
Assistant Examiner—Nathan Mammen
(74) Attorney, Agent, or Firm—Stratton Ballew PLLC

(57) ABSTRACT

A method and apparatus for the processing of hop vines. An automated hop processor cuts bulk-harvested hop vines into manageable segments with a minimum of handling operations. The bulk of hop vines are off-loaded onto an infeed conveyor by positioning a transport on the infeed conveyor. After verifying proper position of the transport a fork can be inserted into the transport. The transport is moved off of the infeed conveyor and the fork removed from the bulk of hop vines. The Hop vines are then moved on the infeed conveyor to a cutter, after verifying the transport is clear of the infeed conveyor. The infeed conveyor is stopped when the hop vines are in position for cutting and the hops are cut with a cutting mechanism. The cut hop vines are then conveyed to a shredder for shredding and further processing into component hop cones and hop vine silage.

7 Claims, 25 Drawing Sheets

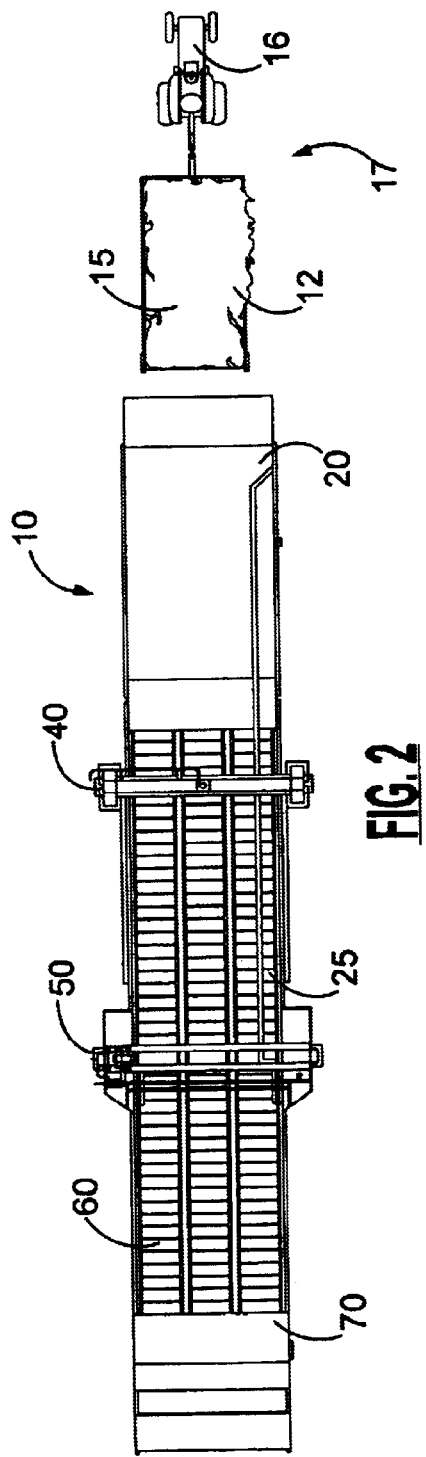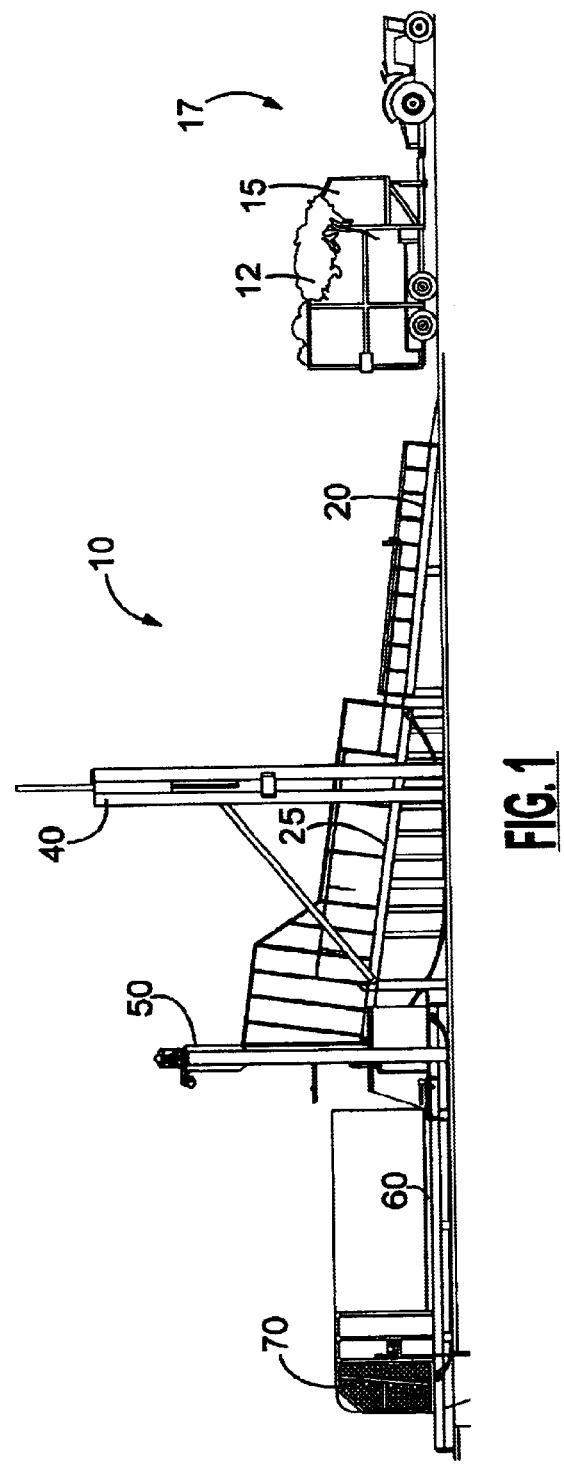

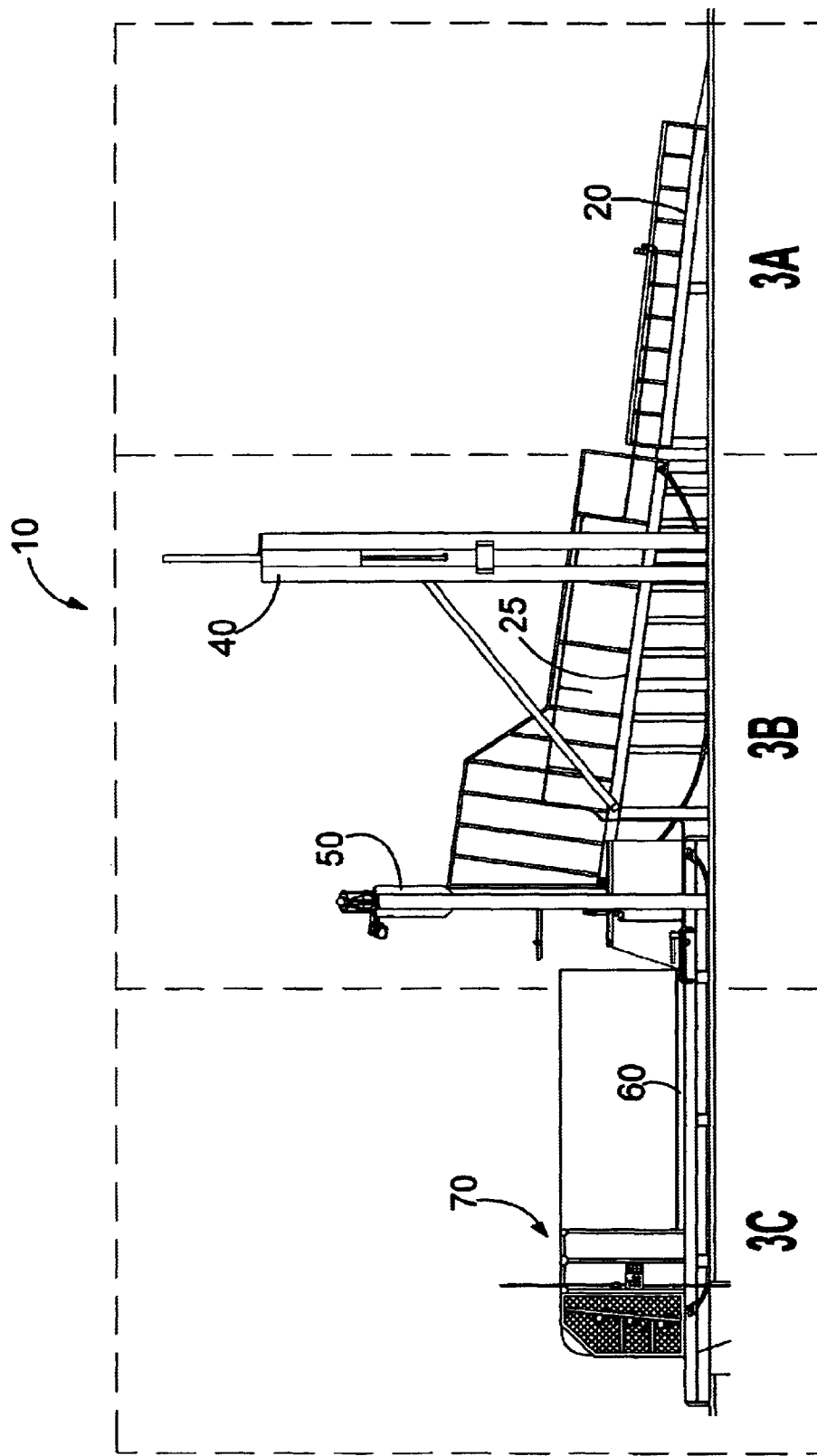

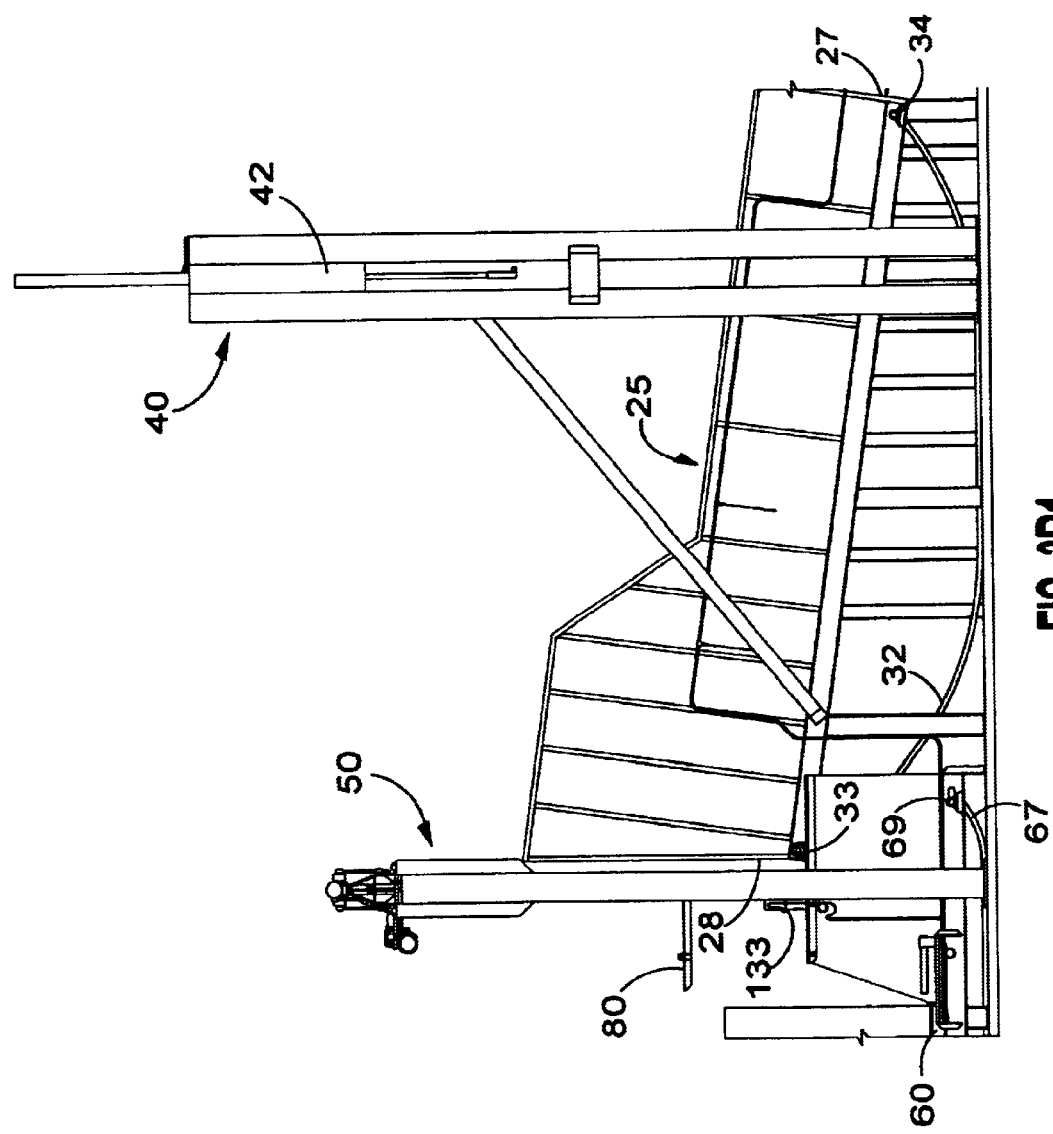
FIG. 3B1

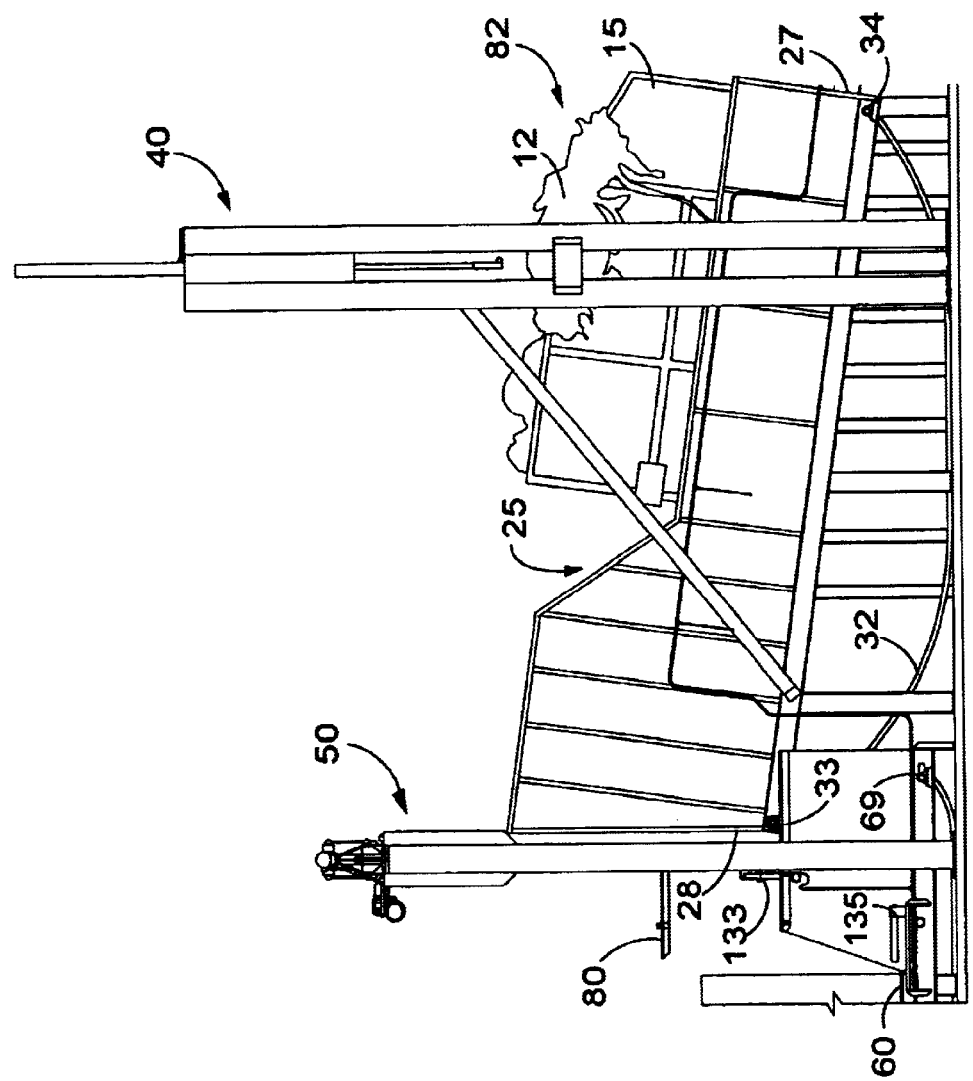

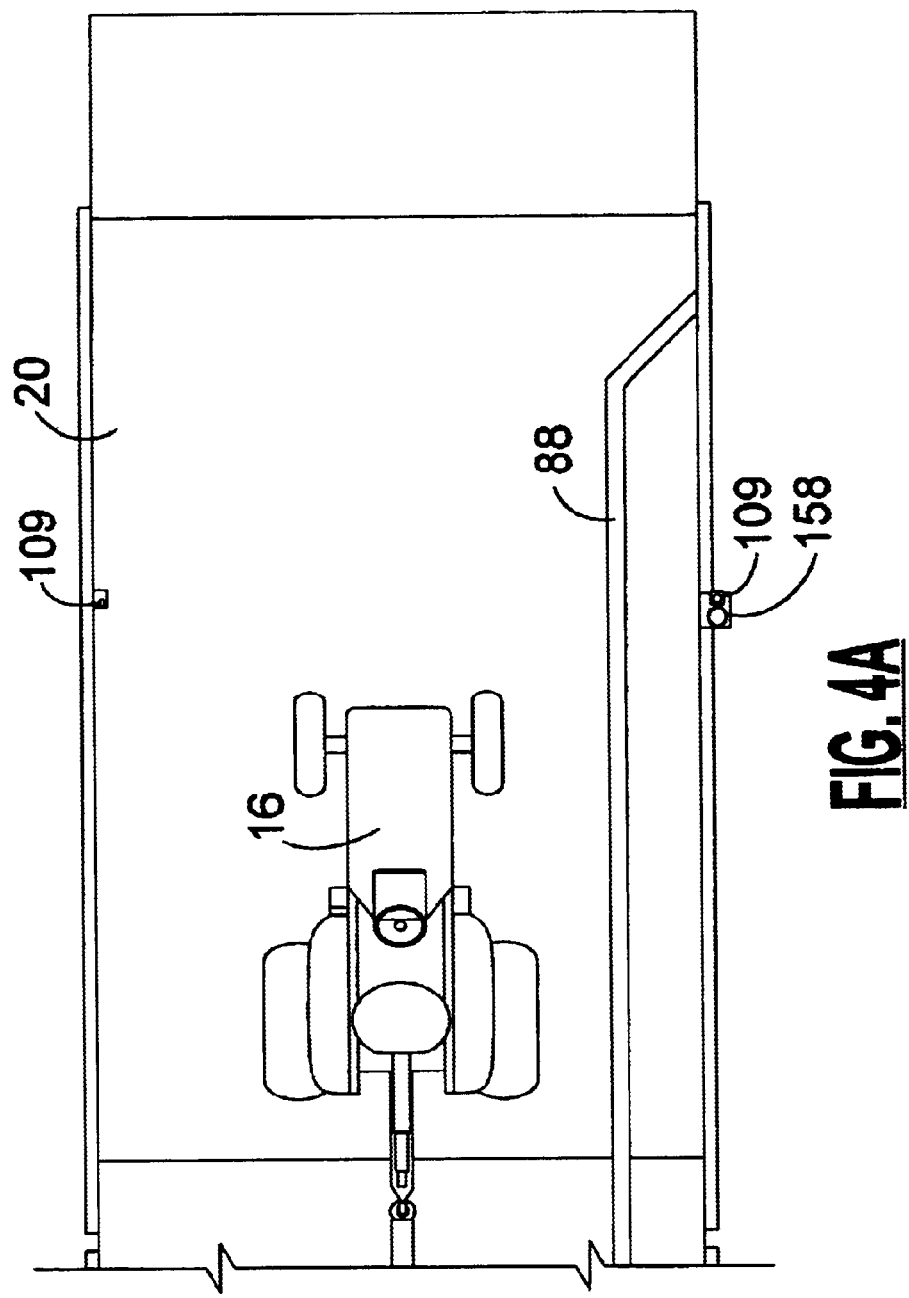

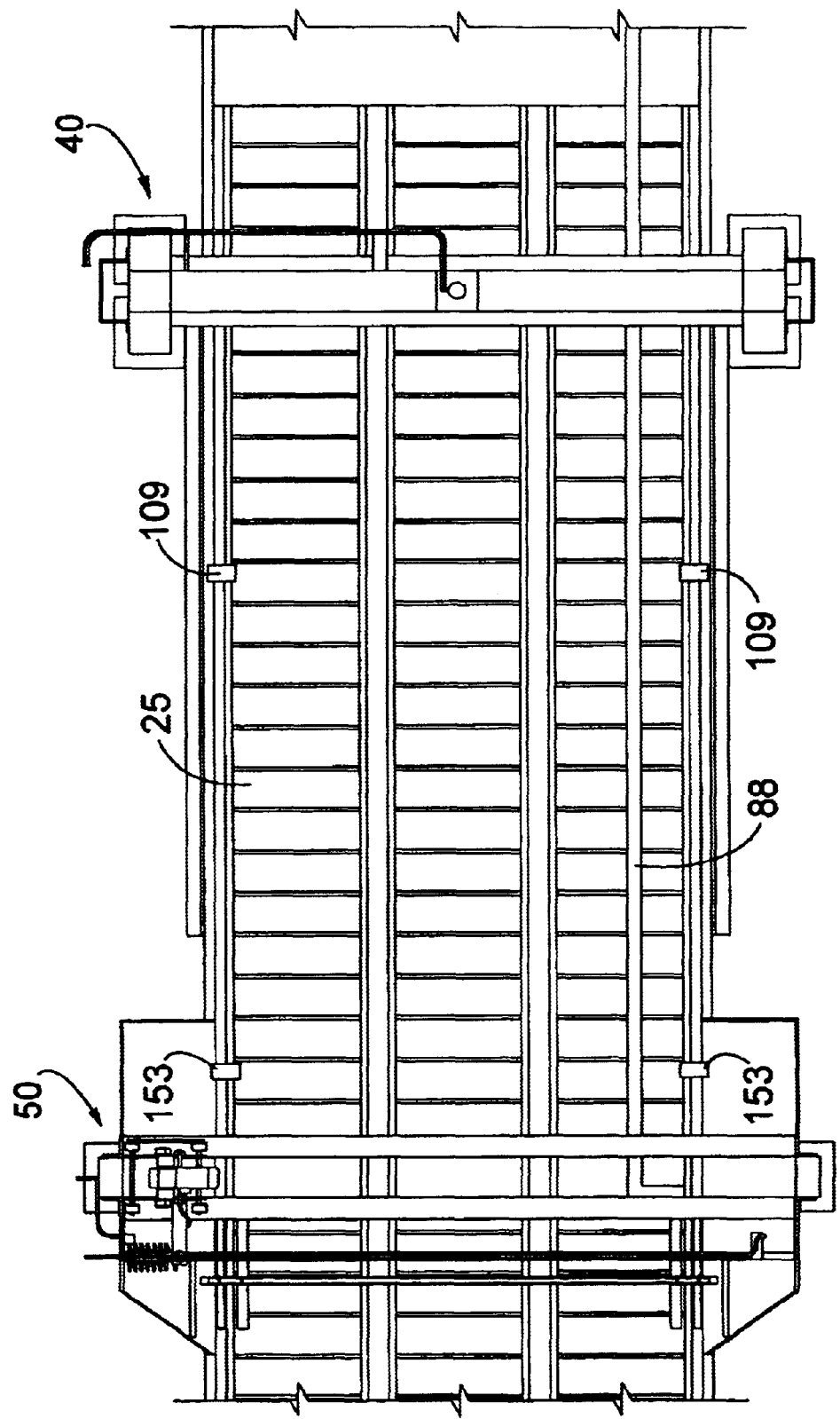

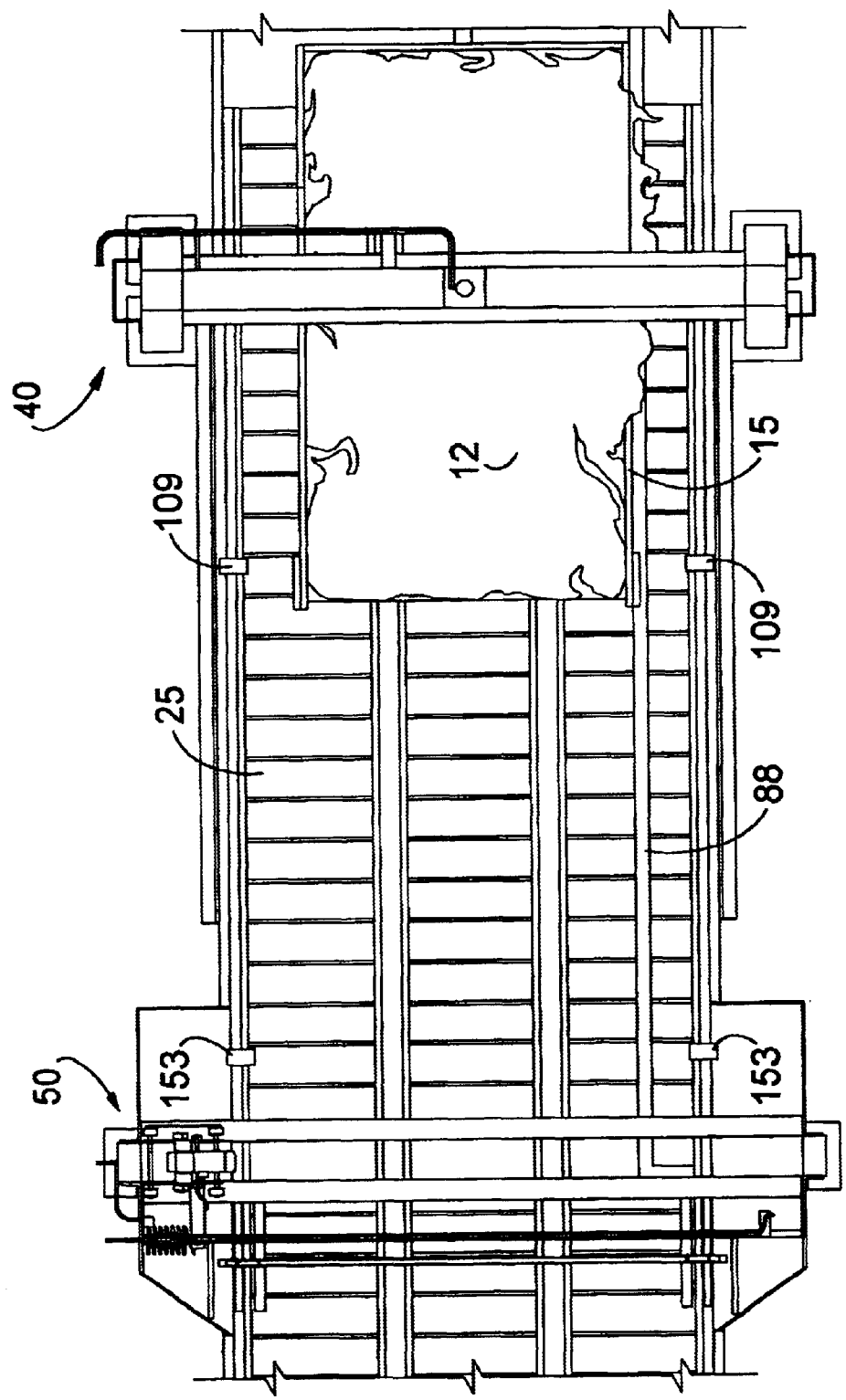
FIG. 4B2

HOP VINE PROCESSOR

TECHNICAL FIELD

The invention relates to a method and apparatus for the processing of hop vines, and more particularly to an automated processor that cuts bulk-harvested hop vines into manageable segments with a minimum of handling operations.

BACKGROUND OF THE INVENTION

Rising farm labor costs and a decrease in available workers willing to perform traditionally low paying tasks has forced many growers to turn to automation. Though often a significant capital investment, what were once labor intensive farming operations can sometime be supplemented or replaced by an automated process. In the long term, these automations have the potential to increase profits and make domestic farming operations competitive with foreign farms, where labor is inexpensive and plentiful.

In the growing of hops, automation is difficult due to the nature of the hop vines. These vines are grown in trellised "yards" and harvested by cutting the vine away from the high wires of the trellis. The cut vines are then brought into a processing facility and individually placed upon hooks. The vines are stripped of cones and the cones are dried. This conventional hop harvesting process requires laborers to both harvest the individual vines and place the vines on the hooks for further processing. A method and apparatus are needed to reduce the labor required to harvest and process hops.

BRIEF DESCRIPTION OF DRAWINGS

FIG. 1 is a side view of a hop vine processor, according to an embodiment of the invention;

FIG. 2 is a top view of a hop vine processor, according to an embodiment of the invention;

FIG. 3 is a side view of a hop vine processor, according to an embodiment of the invention;

FIG. 3B1 is a partial side view of a hop vine processor, referenced as portion '3B' of FIG. 3, according to an embodiment of the invention;

FIG. 3B2 is a partial side view of a hop vine processor, referenced as portion '3B' of FIG. 3, according to an embodiment of the invention;

FIG. 4A is a partial top view of a hop vine processor, referenced as portion '4A' of FIG. 4, according to an embodiment of the invention;

FIG. 4B1 is a partial top view of a hop vine processor, referenced as portion '4B' of FIG. 4, according to an embodiment of the invention;

FIG. 4B2 is a partial top view of a hop vine processor, referenced as portion '4B' of FIG. 4, according to an embodiment of the invention.

DETAILED DESCRIPTION OF SPECIFIC EMBODIMENTS

Figure 3A:
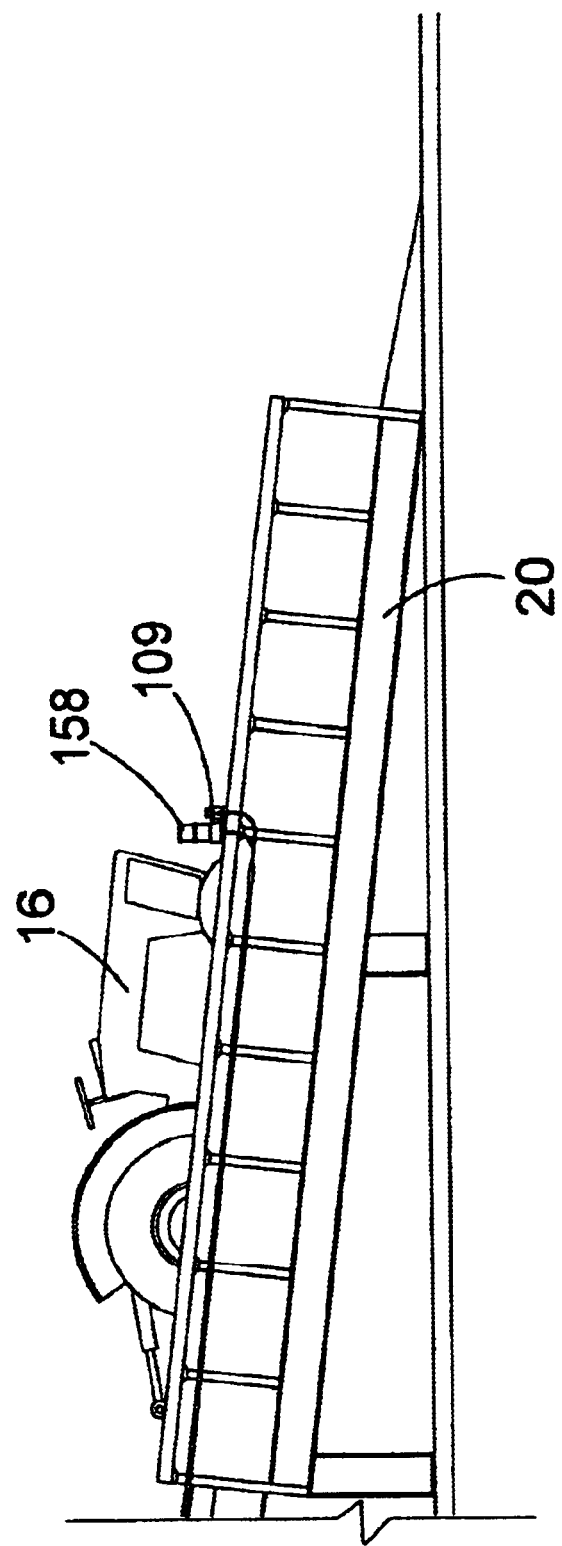
FIG. 3A is a partial side view of a hop vine processor, referenced as portion '3A' of FIG. 3, according to an embodiment of the invention.

The present invention provides a hop vine processor. The hop vine processor automates the cutting of raw, freshly harvested hop vines. The hop vine processor 10 is shown in FIGS. 1 through 8C, and schematically detailed in FIG. 9. The apparatus of the hop vine processor includes mechanisms for the cutting and shredding of raw hop vines, with a minimum of manual handling operations.

As depicted in FIGS. 1 and 2, the hop vine processor 10 receives a bulk of hop vines 12, as typically transported by a trailer 15 pulled by a tractor 16. The bulk of raw hop vines are referred to as a "bulk" in that the hop vines are conventionally harvested and piled into large containers for transportation out of the field. The tractor and trailer, used to haul the bulk of raw hops to the hop vine processor, are together referred to as a transport 17. Alternatively, the transport can be any conventional device that is equivalent to the tractor/trailer combination, such as a truck.

Preferably, the bulk of hop vines 12 are harvested and immediately placed or dropped directly into the transport 17. Harvesting typically includes cutting the vines from an overhead trellis onto which they are trained to grow. These trellises form an ordered, rowed array or "yard." The transport follows a group of harvesters through the hop yard. Any conventional method of removing the hop vines from the overhead trellis system can be employed for the purposes of the present invention. A significant advantage of the present invention is that the individual hop vines need not be kept separate from each other, as required for conventional hop processing systems.

When the transport 17 is full of the bulk of hop vines 12, it proceeds to the hop vine processor 10. As shown in FIG. 3 and detailed in FIG. 3A, the hop vine processor includes a receiving ramp 20. The receiving ramp is preferably inclined to best position the bulk of hop vines for processing The transport backs up the receiving ramp 20 to dump the bulk of hop vines. The hop vine processor includes an infeed conveyor 25. The receiving ramp abuts to the infeed conveyor, as shown in FIGS. 1 through 4. When a tractor 16 and trailer 15 combination are employed as the transport, as preferred, the tractor backs onto the receiving ramp, as shown in FIG. 3A. This places the trailer with its bulk of hop vines on the infeed conveyor, as shown in FIG. 3B2.

As shown in FIGS. 3B1 and 4B1, the infeed conveyor 25 has an infeed conveyor receiving end 27 and an infeed conveyor discharge end 28. The bulk of hop vines 12 form a thick mat or mound that is received by the hop vine processor 10 on the infeed conveyor, proximate the infeed conveyor receiving end. The bulk of hop vines is an interwoven and agglomerated mass due to the way the individual hop vines are cut and piled into the transport As preferred, the infeed conveyor 25 is essentially a conventional belt conveyor, and so includes an infeed endless belt 32 that circulates about a drive roller 33 and a return roller 34. As shown in FIGS. 3B1 and 3B2, the drive roller is preferably located proximate to the infeed conveyor discharge end 28, and the return roller is preferably located proximate the infeed conveyor receiving end 27. The infeed endless belt is most preferably an interlocked metal mesh, or alternatively a reinforced rubber material. Additionally, the infeed endless belt preferably has openings through its surface that are sufficient to provide drainage, as shown in FIGS. 4B1 and 4B2. The surface of the infeed endless belt should be of sufficient roughness to create a traction against the bulk of hop vines 12. This roughness is utilized to pull the bulk of hops along the infeed conveyor and is most preferably of a corrugated texture.

As discussed above, the bulk of hop vines 12 typically forms a mound or thick mat within the transport 17. To aid in the removal of the bulk of hop vines from the transport, the hop vine processor 10 can additionally include a removal fork mechanism 40. The removal fork mechanism is positioned above the transport, proximate to the infeed conveyor receiving end 27. As shown in FIGS. 1, 2, 3, 3B1, 3B2, 5A, 5B, 5C, 5D, and 5E, the removal fork mechanism is preferably mounted over the infeed conveyor. The removal fork mechanism includes a fork frame 42 that preferably spans the infeed conveyor. A fork 45 is received within the fork frame and moves up and down within the fork frame by the operation of a fork actuator 46. The fork actuator alternatively inserts or removes the fork into or out of the bulk of hop vines.

As discussed above in reference to a typical transport, the preferred transport is the trailer 15, pulled by the tractor 16. The infeed conveyor transfers the raw hop vines to a cutter 50. The cutter is employed to reduce the bulk of hop vines into a cut hop vine 52, which can be more easily processed to remove and separate individual hop cones from the vines. The cutter is located proximate to the infeed conveyor discharge end 28, as shown in FIGS. 3, 3B1, and 3B2.

Figure 6A:
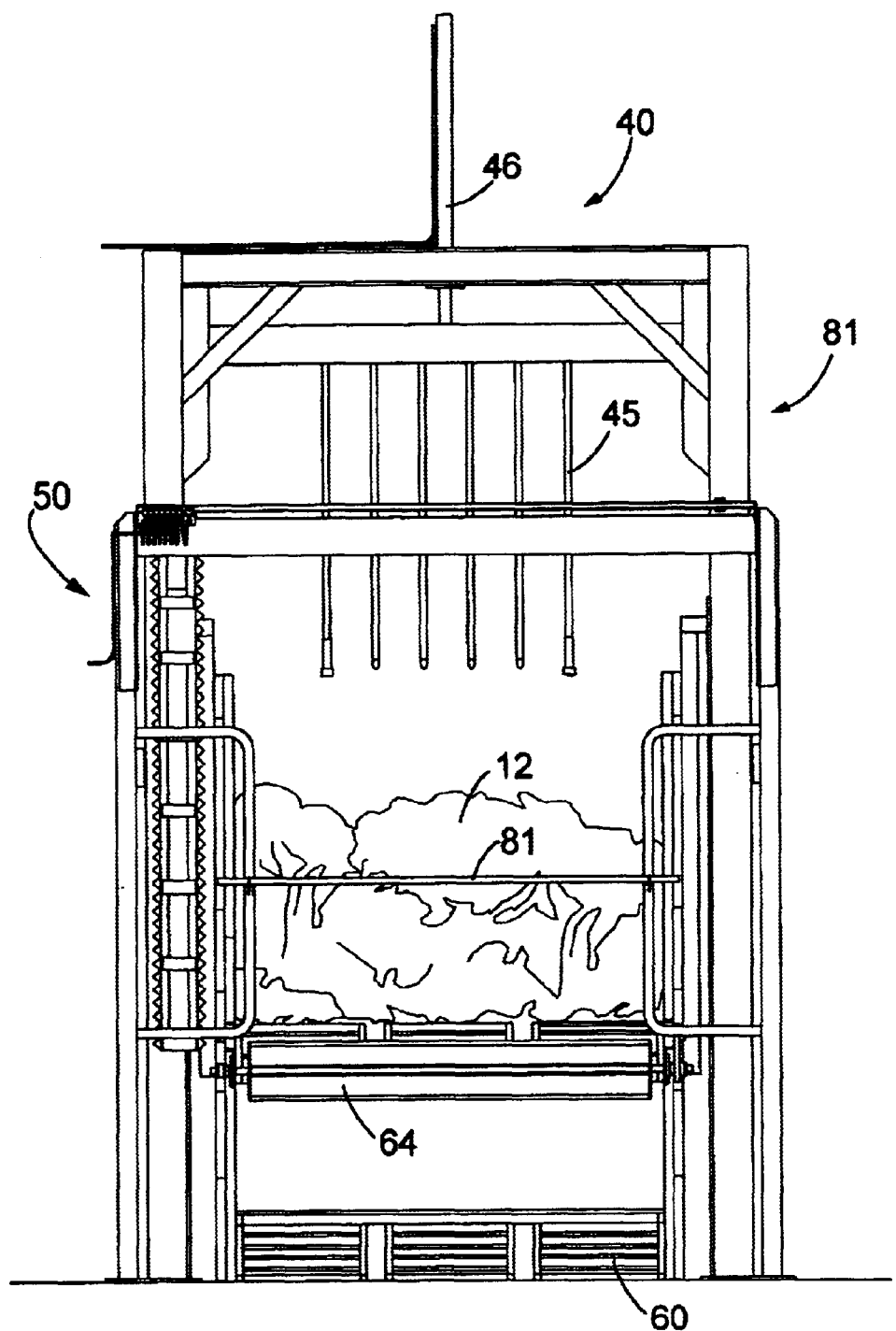
FIG. 6A is an end view of a hop vine processor, according to an embodiment of the invention.
Figure 6B:
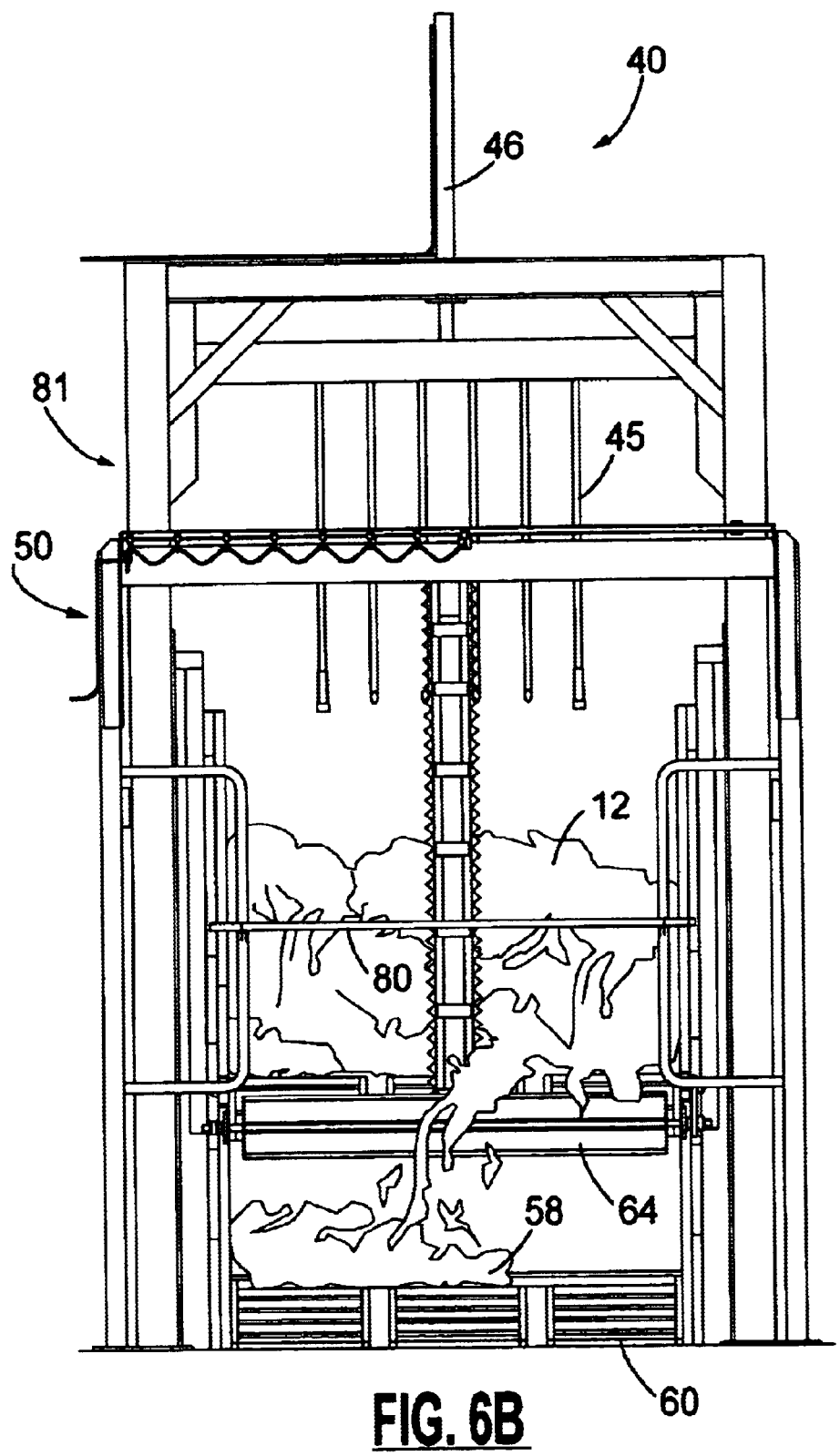
FIG. 6B is an end view of a hop vine processor, according to an embodiment of the invention.
Figure 6C:
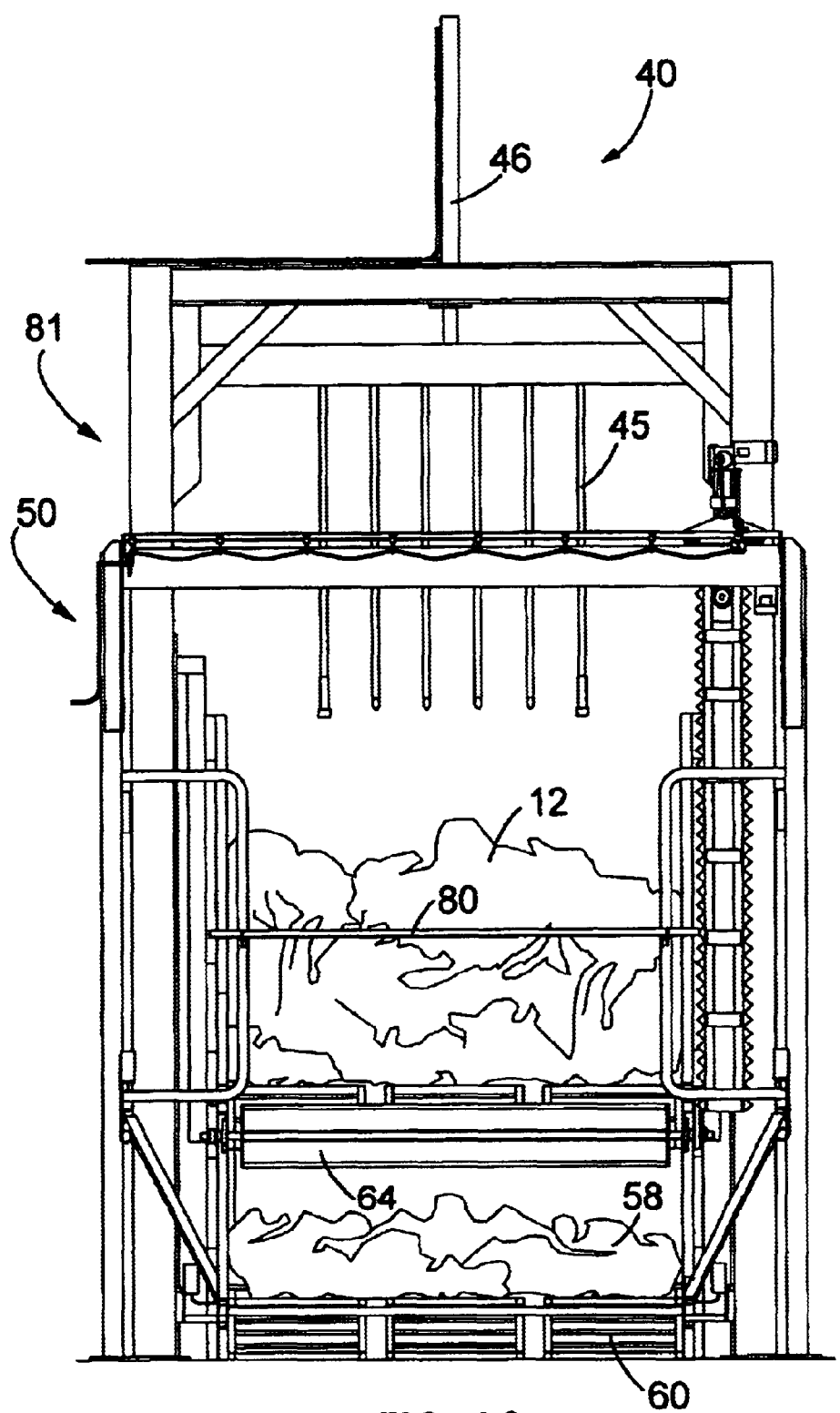
FIG. 6C is an end view of a hop vine processor, according to an embodiment of the invention.

In FIG. 6A, the cutter 50 is shown receiving the bulk of hop vines 12 from the infeed conveyor 25. The cutter has a cutter carriage 52 mounted to a cutting blade 53. The cutter carriage travels along a gantry 54. In the preferred embodiment, as shown in FIGS. 6A, 6B and 6C, the gantry is suspended above and across the infeed conveyor discharge end 28. The cutter carriage moves across gantry to present the cutting blade to the bulk of hop vines, along a cutting plane 57. The cutting plane is shown in FIGS. 6B and 6C, as a surface that is substantially perpendicular to the infeed endless belt 32 carrying the bulk of hop vines at the infeed discharge end. The cutting plane is directly below and follows the length of the gantry.

The cutting blade 53 cuts the bulk of hop vines 12 across the cutting plane 57 to form cut hop vines 58. The cutting blade of the cutter can be any sawing or slicing blade configured to travel across the bulk of hop vines 12, at a location proximate to the conveyor discharge end 28. A preferred cutting blade is a reciprocating "trimmer" type of cutting device, as often employed for cutting hedges, shrubs and similar vegetation. The cutting blade of the preferred trimmer includes a first reciprocating blade 62 mounted against a second reciprocating blade 63. The first reciprocating blade and the second reciprocating blade are mounted to the carriage 52 and quickly move up and down in opposite directions from each other, either away from or back to the carriage. The action of the first reciprocating blade against the second reciprocating blade efficiently cuts any material contacting the cutting blade along the cutting plane.

Alternatively, the second reciprocating blade 63 can be stationary relative to the carriage 52, with only the first reciprocating blade 62 moving away from and back to the carriage, along the stationary second reciprocating blade. However, this configuration has been found to be less desirable, in that it results in binding as the cutting blade travels through the bulk of hop vines 12.

As shown in FIGS. 6A, 6B, 6C, 7, 8A, 8B, and 8C, a paddle wheel 64 can be used to aid in the movement of the bulk of hop vines 12 while maintaining the hop vines in position for cutting. The paddle wheel is positioned proximate to the conveyor discharge end 28 of the infeed conveyor 25. The paddle wheel is preferably configured to allow the cutting blade to pass close to the wheel, providing a clean and precise cut along the cutting plane 57.

From the cutter 50, a shredder conveyor 60 receives the cut hop vines 58. The shredder conveyor includes a shredder conveyor receiving end 65 and a shredder conveyor discharge end 66. The cut hop vines are received onto the shredder conveyor proximate to the shredder conveyor receiving end, where they fall when cut by the cutting blade. The cut hop vines are then moved to the shredder conveyor discharge end by the rotation of a shredder endless belt 67.

Figure 3C:
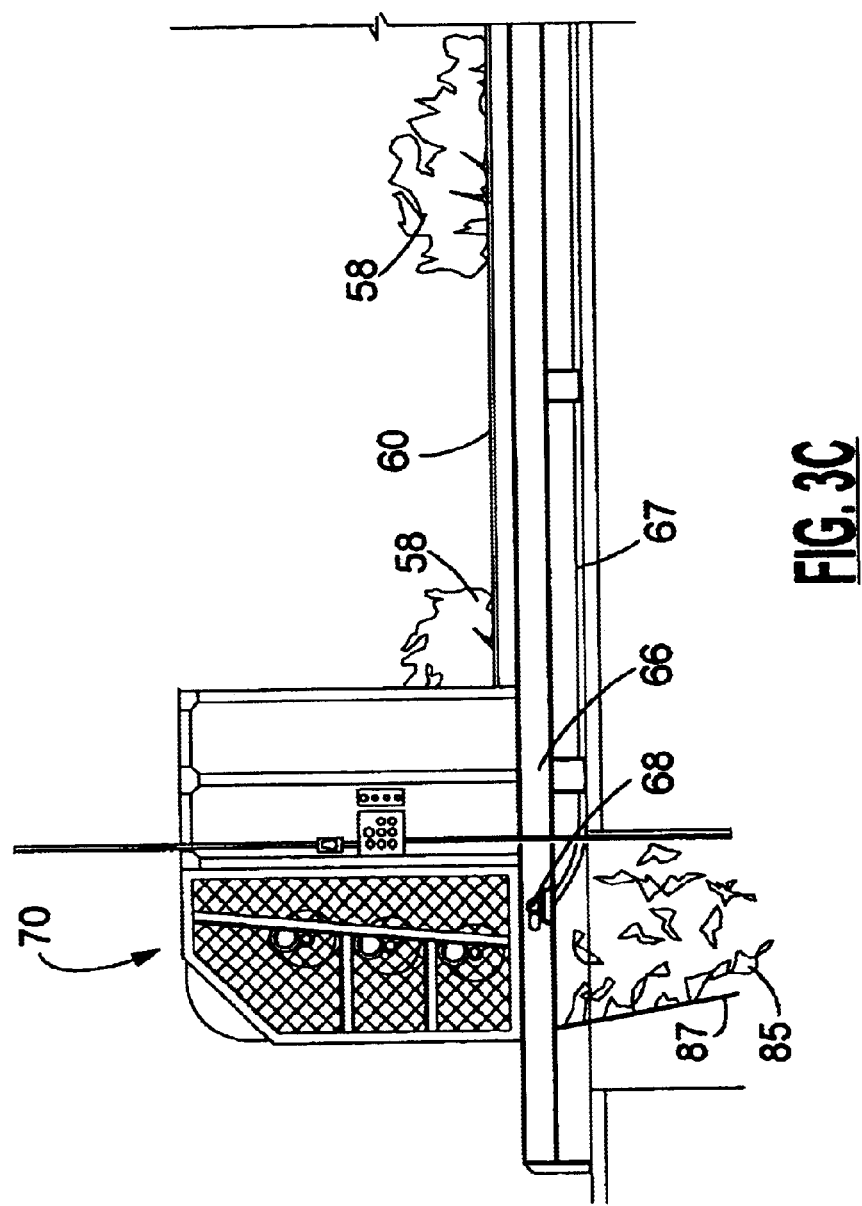
FIG. 3C is a partial side view of a hop vine processor, referenced as portion '3C' of FIG. 3, according to an embodiment of the invention.
Figure 7:
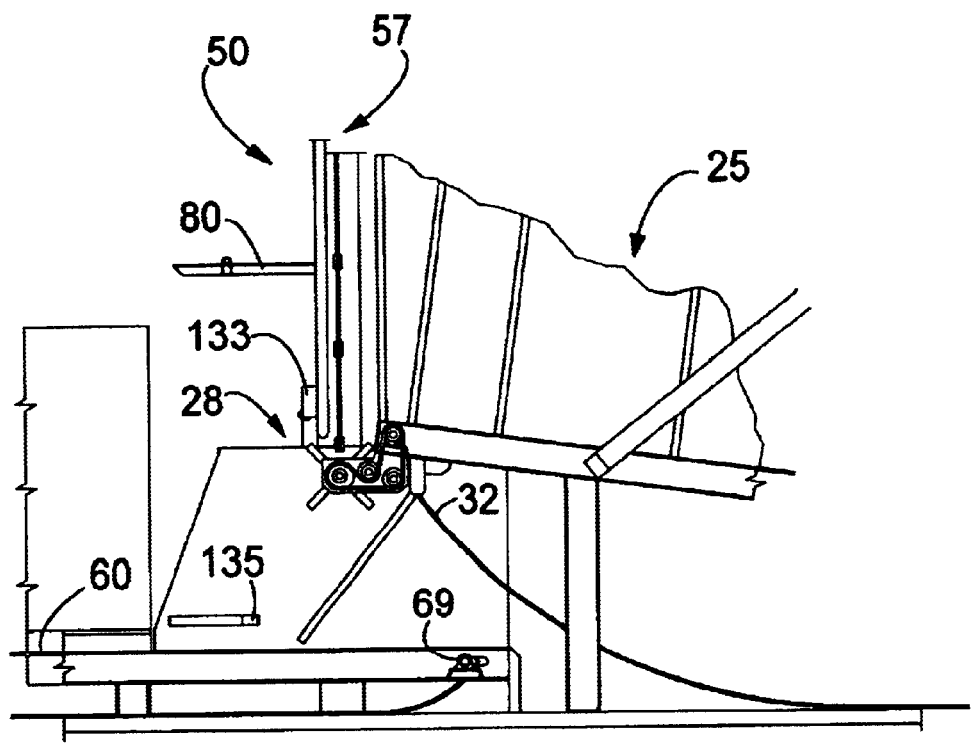
FIG. 7 is a detailed side view portion of a hop vine processor, according to an embodiment of the invention.
Figure 8A:
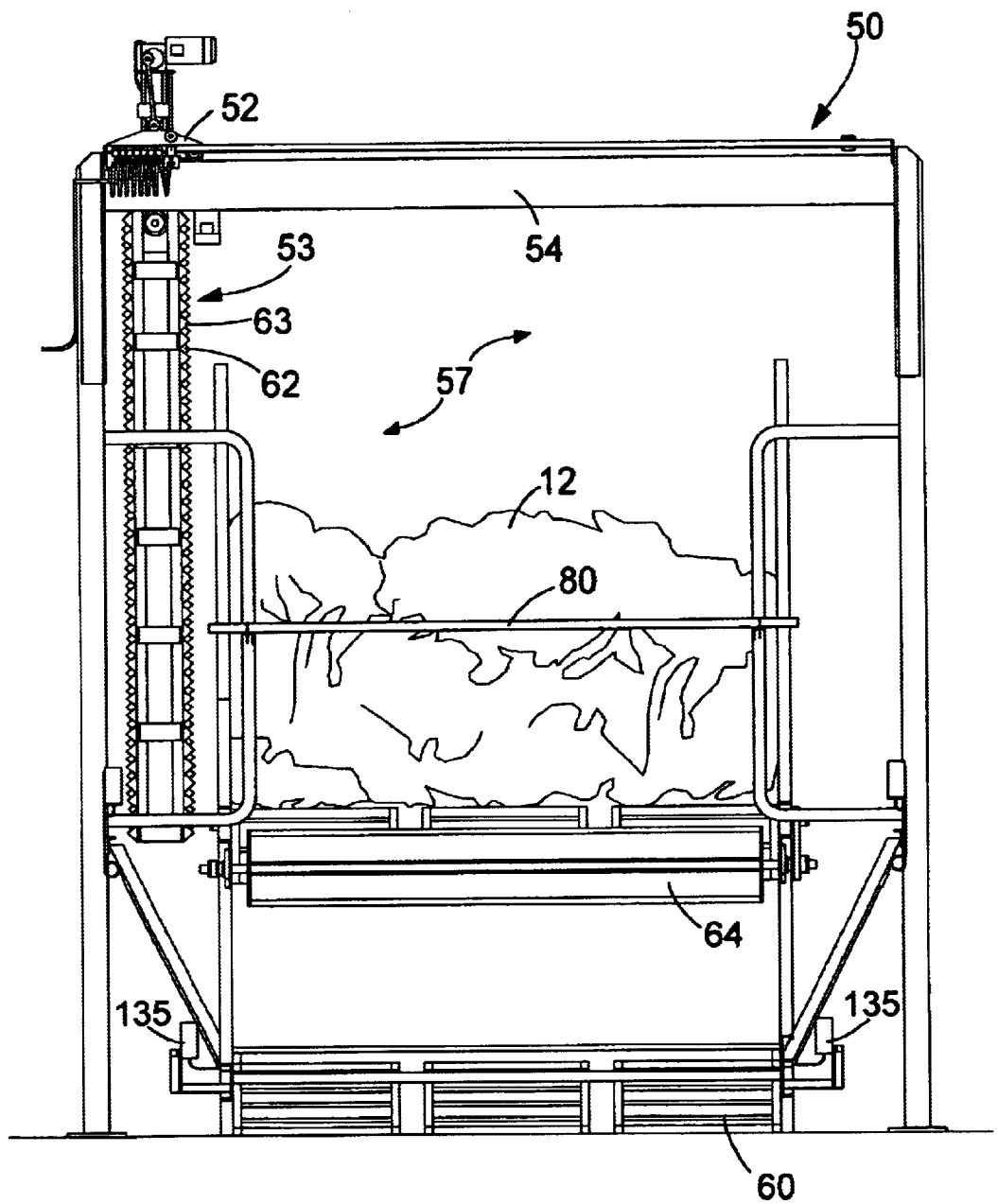
FIG. 8A is an end view of a hop vine processor, according to an embodiment of the invention.
Figure 8B:
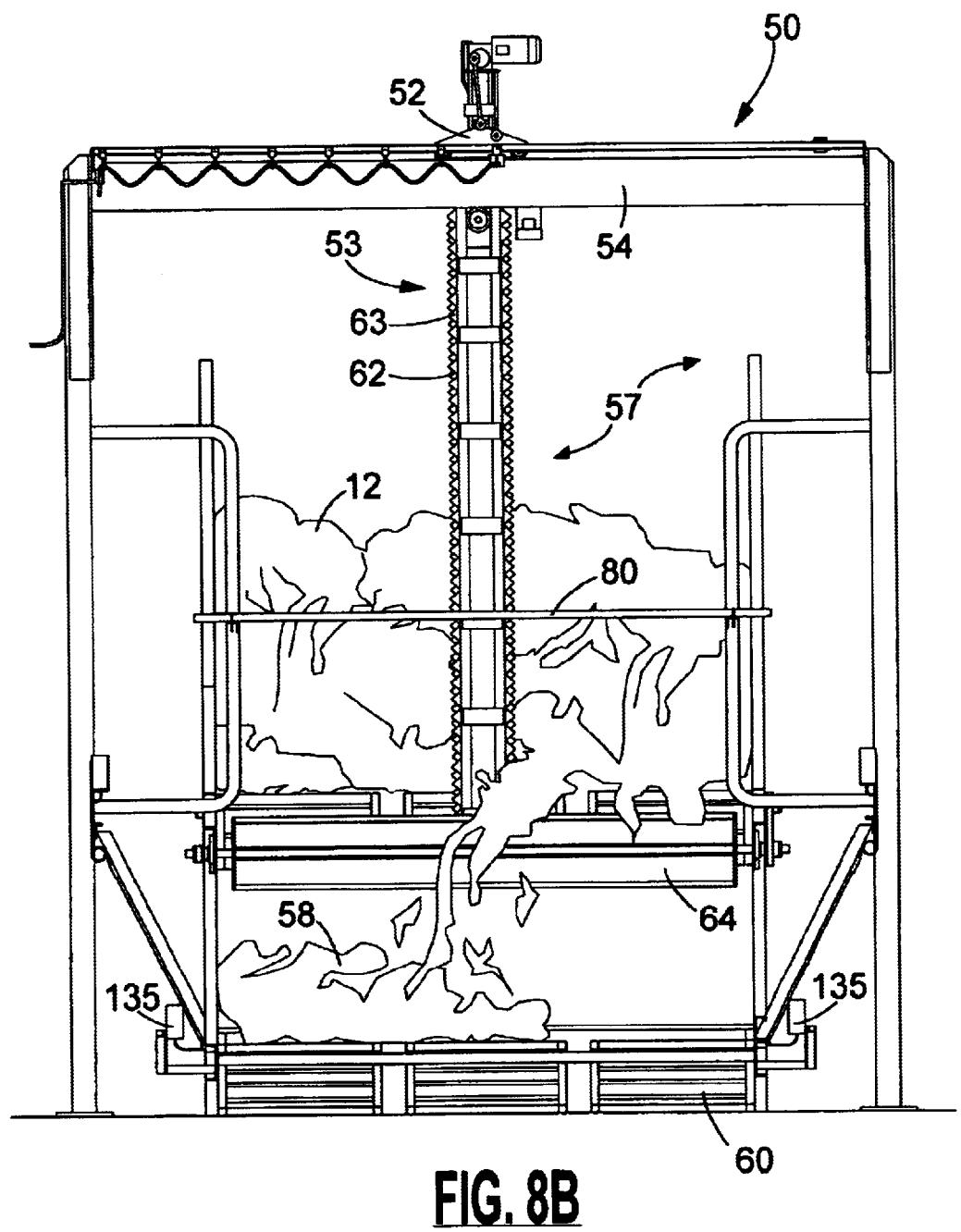
FIG. 8B is an end view of a hop vine processor, according to an embodiment of the invention.
Figure 8C:
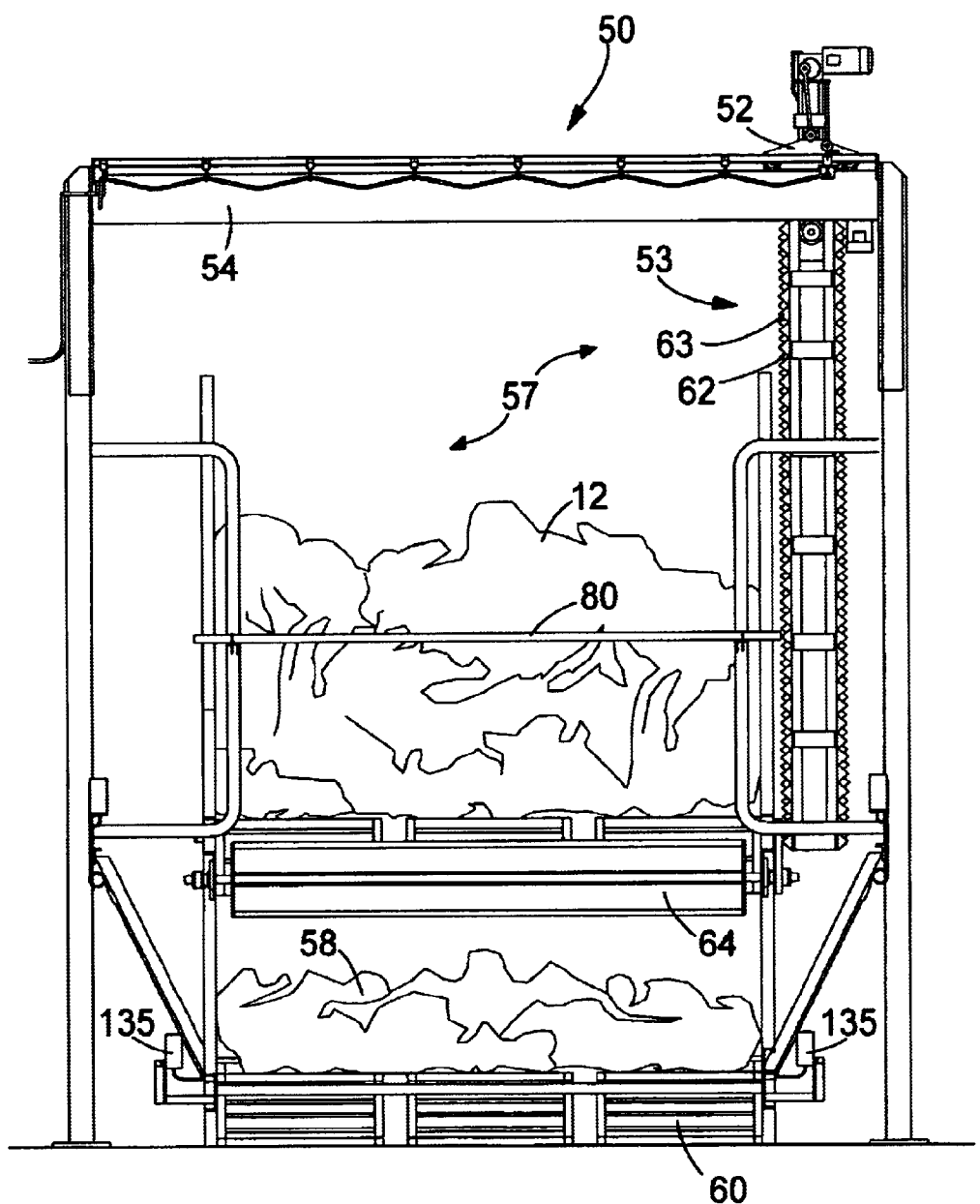
FIG. 8C is an end view of a hop vine processor, according to an embodiment of the invention.

As preferred, the shredder conveyor 60, like the infeed conveyor 25, is also a conventional belt conveyor, and so the shredder endless belt 67 circulates about a drive roller 68, shown in FIG. 3C, and a return roller 69, as shown in FIG. 7. The drive roller is preferably located proximate to the shredder conveyor discharge end 66, and the return roller is preferably located proximate the shredder conveyor receiving end 65.

Figure 4:
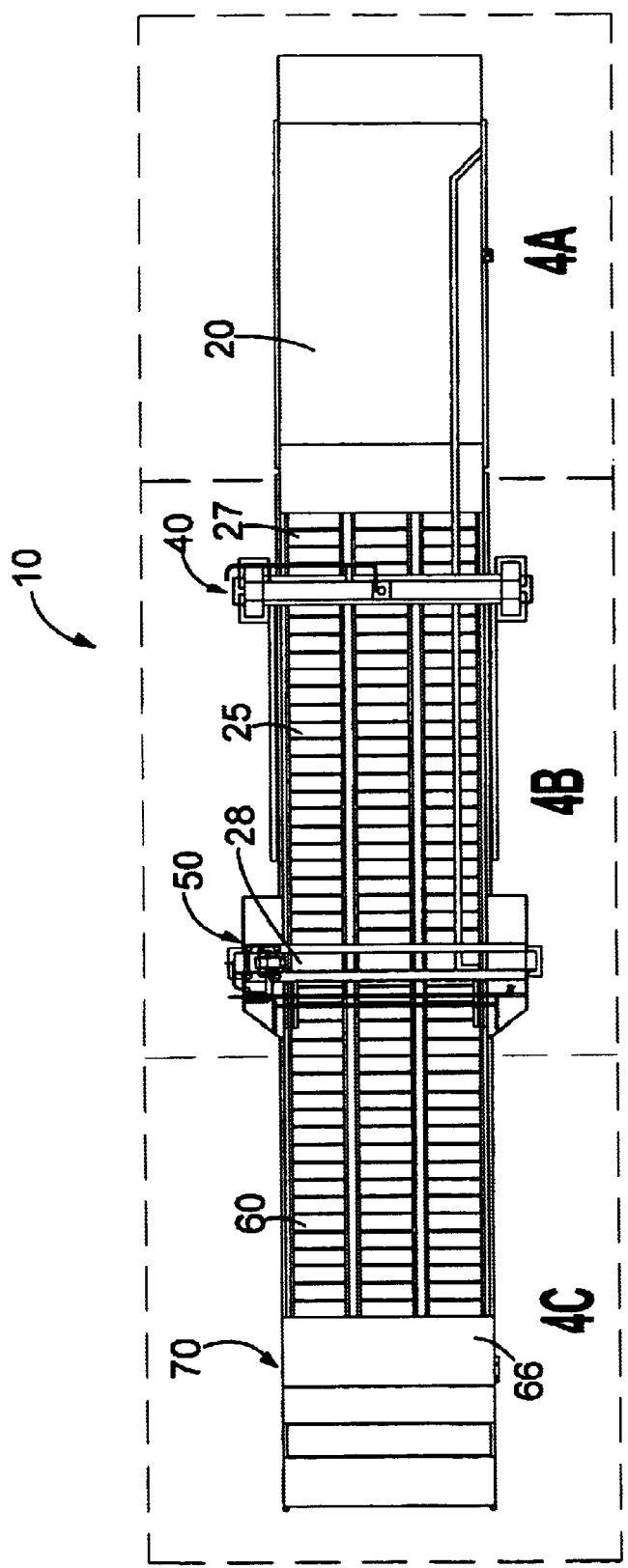
FIG. 4 is a top view of a hop vine processor, according to an embodiment of the invention.
Figure 4C:
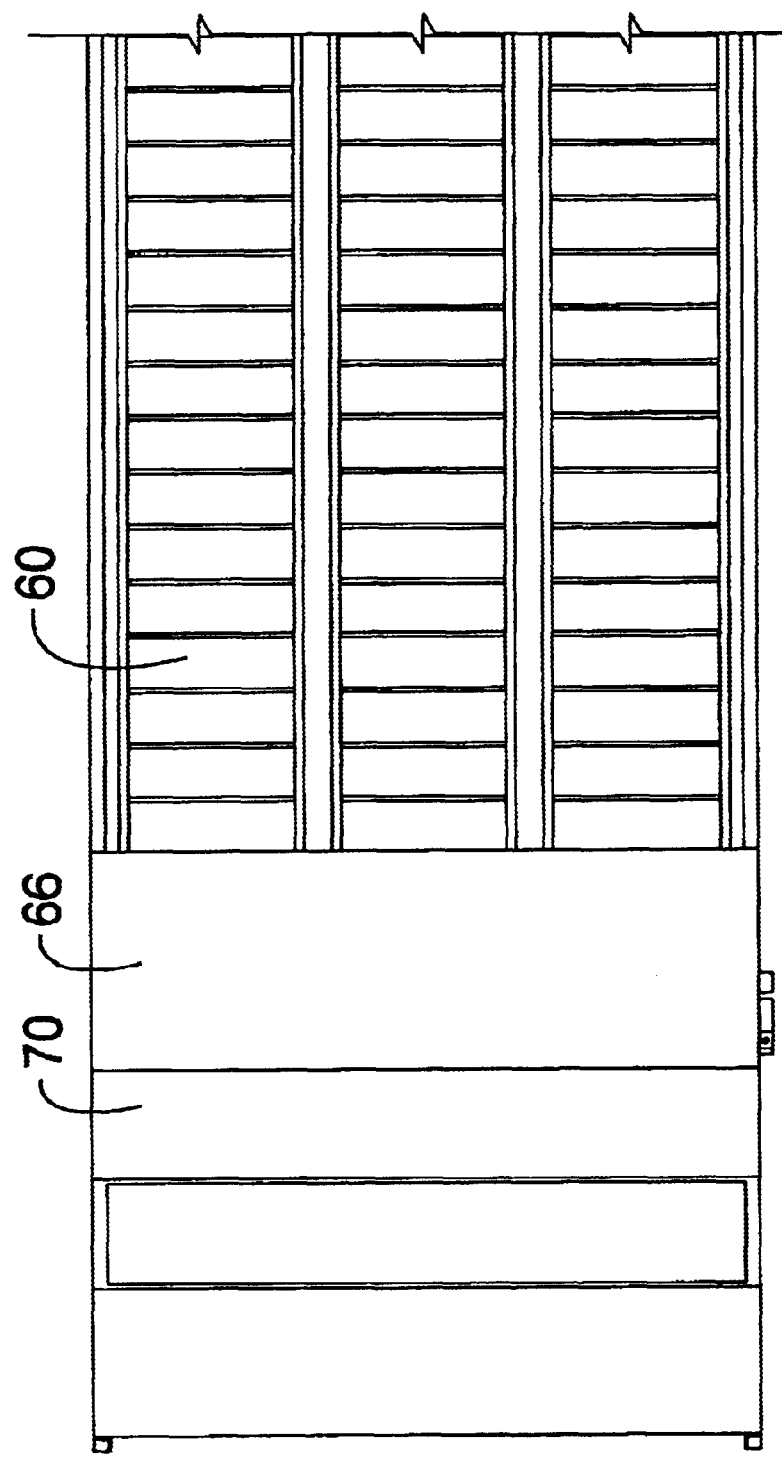
FIG. 4C is a partial top view of a hop vine processor, referenced as portion '4C' of FIG. 4, according to an embodiment of the invention.

The shredder endless bell 67, like the infeed endless belt 32, is most preferably an interlocked metal mesh, or alternatively a reinforced rubber material. Additionally, the shredder endless belt preferably has openings through its surface, as shown in FIG. 4C, which are sufficient to provide water drainage. The surface of the shredder endless belt should be of sufficient roughness to create a traction against the cut hop vines 58. This roughness is utilized to pull the cut hop vines along the shredder conveyor and is most preferably of a corrugated texture.

The shredding conveyor 60 transfers the cut hop vines 58 to a shredder 70. The shredder includes a rotating mechanism 72 that shreds the cut hop vine. The preferred shredder mechanism is of a conventional design, similar to that disclosed in U.S. Pat. No. 5,573,190, which is a bale type of shredder. The purpose of the shredder, as it is employed in the present invention, is to shred or chop the cut hop vines into smaller, more easily process-able portions, so that the cones can be separated from the vine, leaf and twine originally within the bulk of hop vines. The shredder is positioned proximate to the shredder conveyor discharge end 67.

To prevent the introduction of uncut bulk hop vines 12 from entering the shredder 70, a block bar 80 is preferably employed in the present invention, as shown in FIGS. 3B1, 3B2, 4B1, 4B2, 6A, 6B, 6C, 7, 8A, 8B, and 8C. The block bar partially obstructs the infeed conveyor 25 to stop the further progress of hop vines, unless the vines are cut by the cutter 50. Once the bulk of hop vines are cut by the cutter, they drop down onto the shredding conveyor 60, instead of proceeding forward toward the shredder, unimpeded.

Figure 5A:
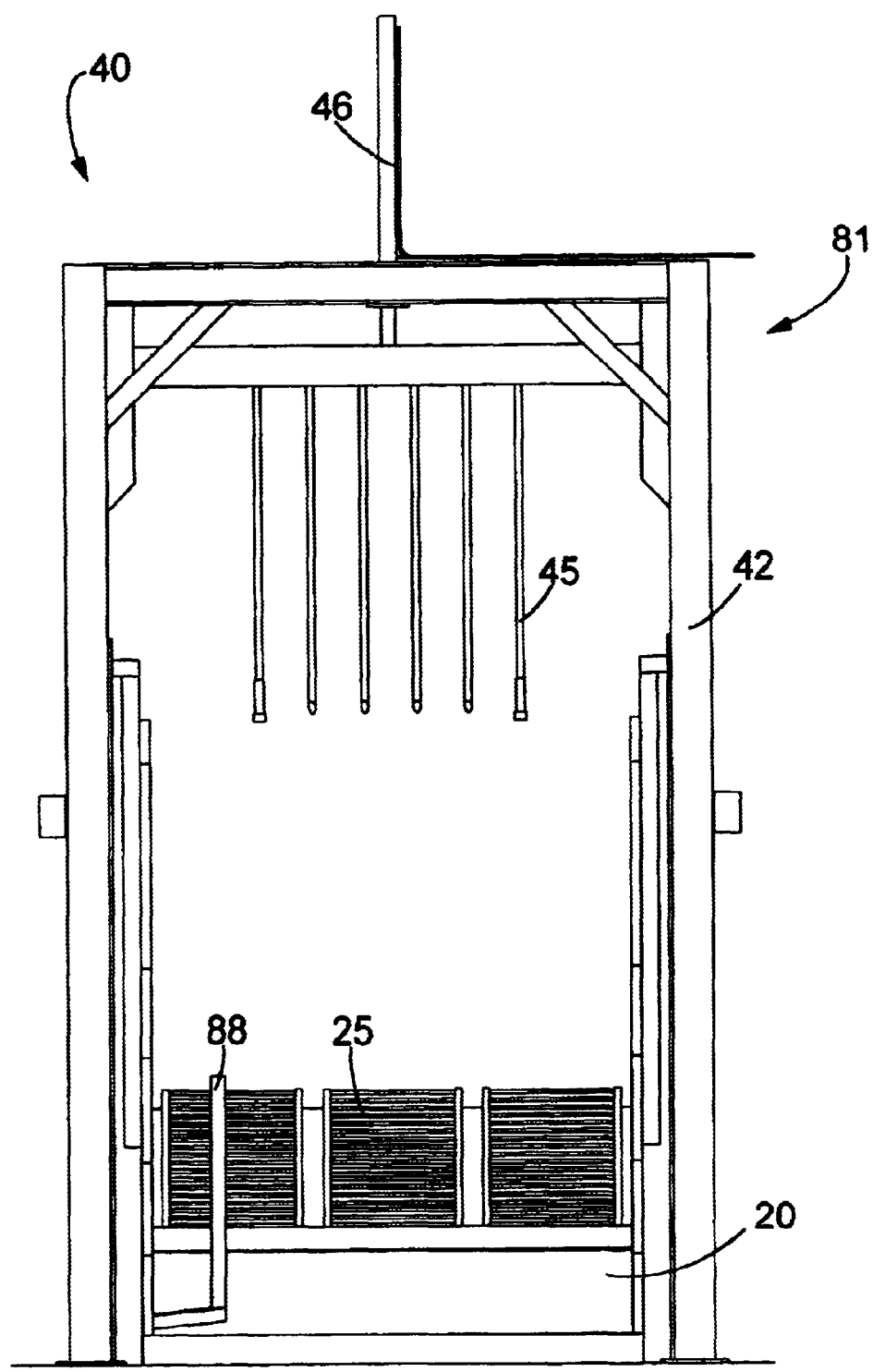
FIG. 5A is an end view of a hop vine processor, according to an embodiment of the invention.
Figure 5B:
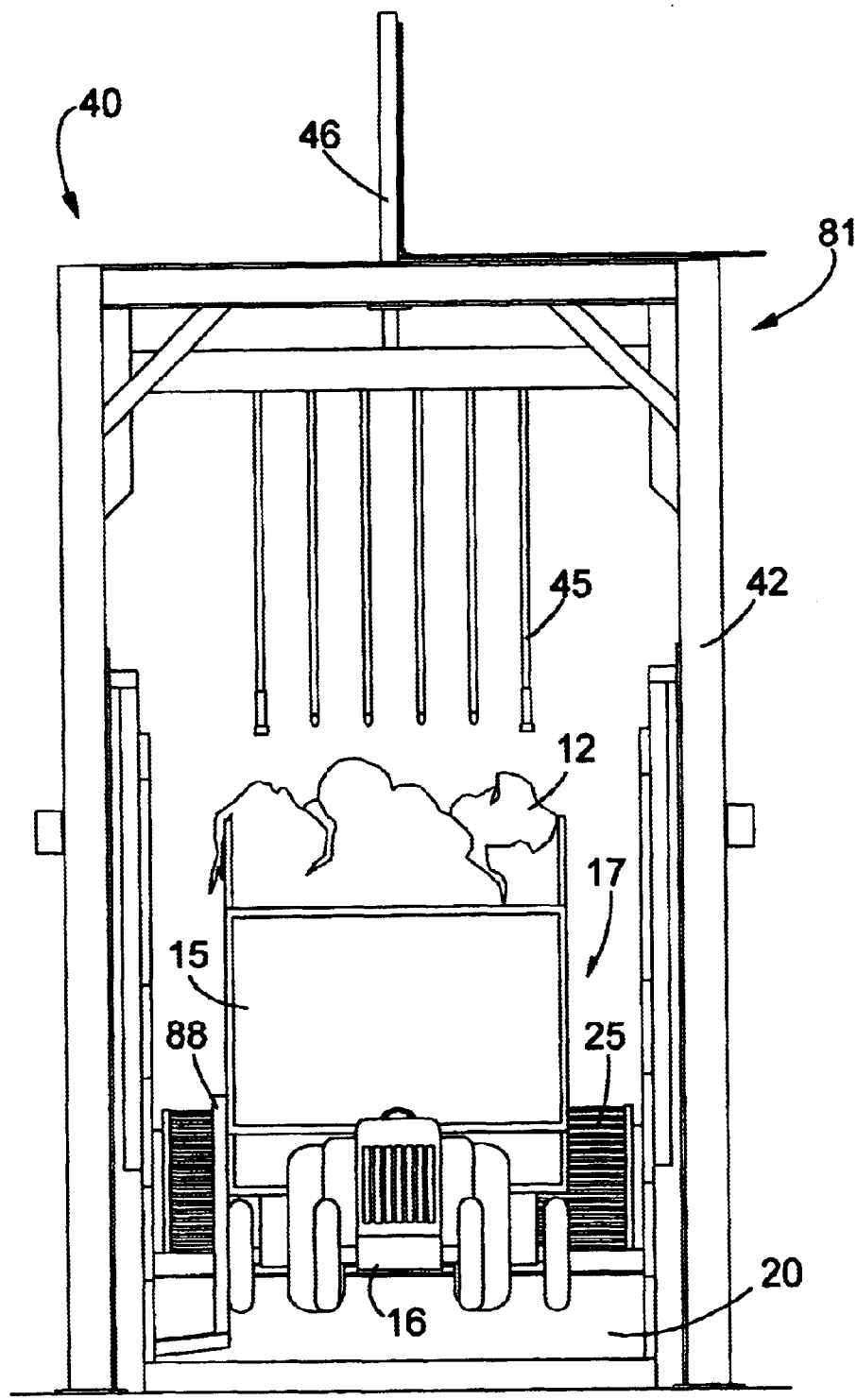
FIG. 5B is an end view of a hop vine processor, according to an embodiment of the invention.
Figure 9:
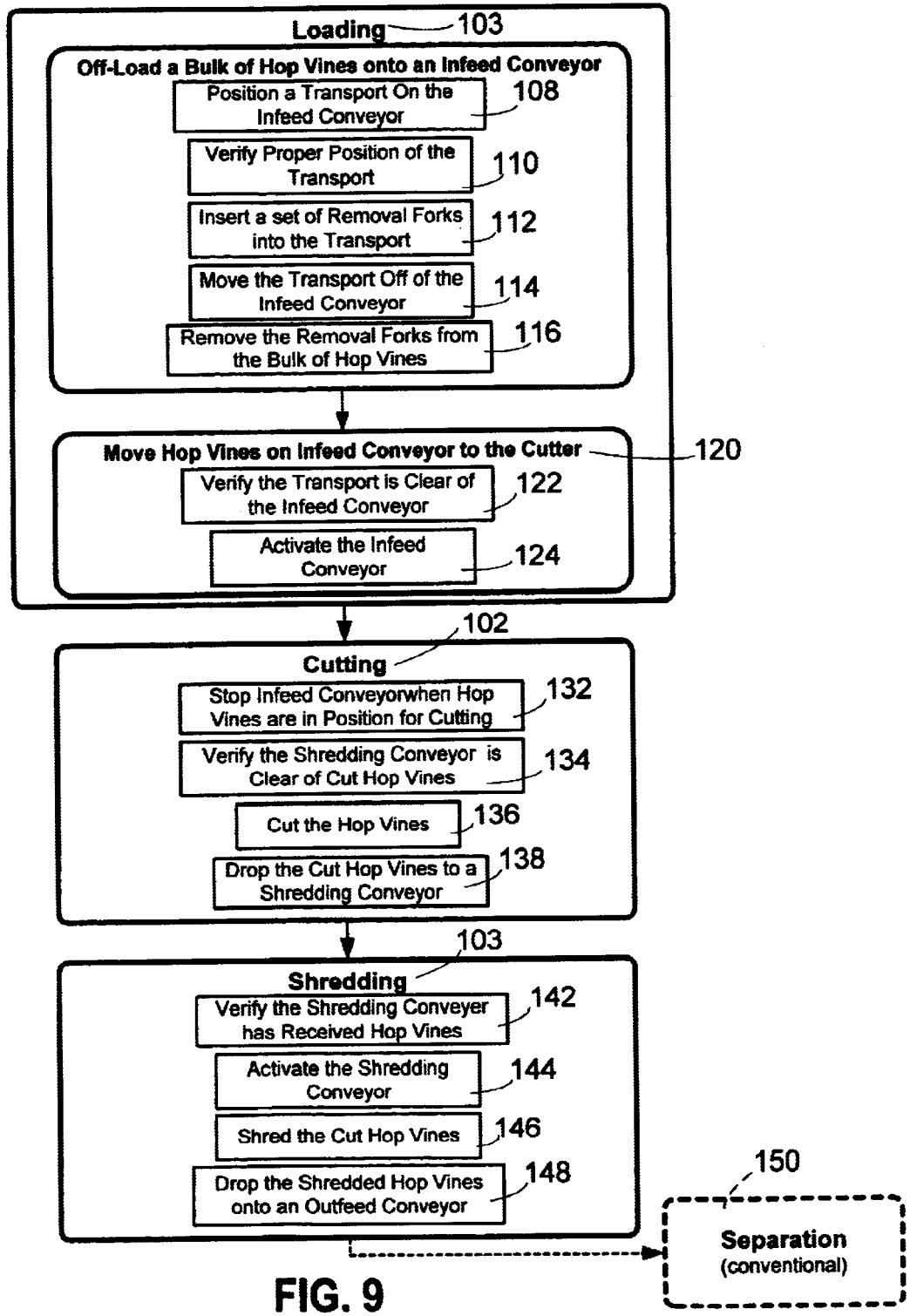
FIG. 9 is a schematic of a method for a hop vine processor, according to an embodiment of the invention.

A preferred method of processing hop vines 100 includes the steps schematically shown in FIG. 9. Three primary steps for processing hops with the method of the present invention include, but are not limited to loading 101, cutting 102 and shredding 103. The initial step of loading the bulk of hop vines 12 includes carrying the vines from the field to the infeed conveyor 25, with the transport 17. The loading step essentially includes off-loading the bulk of hop vines onto the infeed conveyor 106. For a most preferred embodiment of the method of the present invention, the offloading of the bulk of hop vines additionally includes the use of the removal fork mechanism 40, as shown in FIGS. 1, 3B2, 4B2, 5B and 5C, to accommodate the transport, such as the trailer 15 pulled by a tractor 16. The transport carries the bulk of hop vines from the field or hop yard to off-load the bulk of hop vines onto the infeed conveyor 25. To facilitate the off-loading, the transport is positioned on the infeed conveyor 108, with the fork 45 of the removal fork mechanism initially in a raised position 81, as detailed in FIGS. 3B1 and 5A. The trailer is backed up onto the receiving ramp 20 of the hop vine processor 10, until the transport is in an off-load position 82, as shown in FIGS. 3B2 and 5B. In the off-load position, the trailer of the transport is located above the infeed conveyor, so that any of the bulk of hop vines that are removed from or dumped out of the trailer, fall to the infeed conveyor.

To best position the transport 17 in the offload position 82, a transport position sensor 86 is preferably employed to verify that the transport is in proper position The transport position sensor can be any electric eye or other sensor typically employed for such a use and well known in automation and process control. Because the fork must be deployed with care that no damage occurs to the trailer 15 or the transport, most preferably, the insertion of the fork into the transport 112 is locked out until the transport is verified to be in the proper position.

A guide rail 88, as shown in FIGS. 4A, 4B1, 4B2, 5A, 5B, 5C, 5D, 5E, and 5F, can also be employed as an aid on the infeed conveyor to help place the trailer 15 or transport 17 in the proper position for fork 45 insertion. The guide rail is preferably metal, and placed a height that fends the transport on the infeed conveyor without damage, while guiding the transport into proper position below the fork 45 for unloading the bulk of hop vines 12.

The transport position sensor 86 can also be employed to raise the fork 45. As soon as the transport 17 is removed from the infeed conveyor and away from the off-load position, the fork can be removed from the bulk of hop vines and lifted to the raised position 81. The transport position sensor can additionally be employed to verify the transport is clear of the infeed conveyor. After the transport position sensor verifies the transport has been removed, the infeed conveyor 25 can be activated to move the bulk of hop vines 12 on the infeed conveyor to the cutter 50.

Figure 5C:
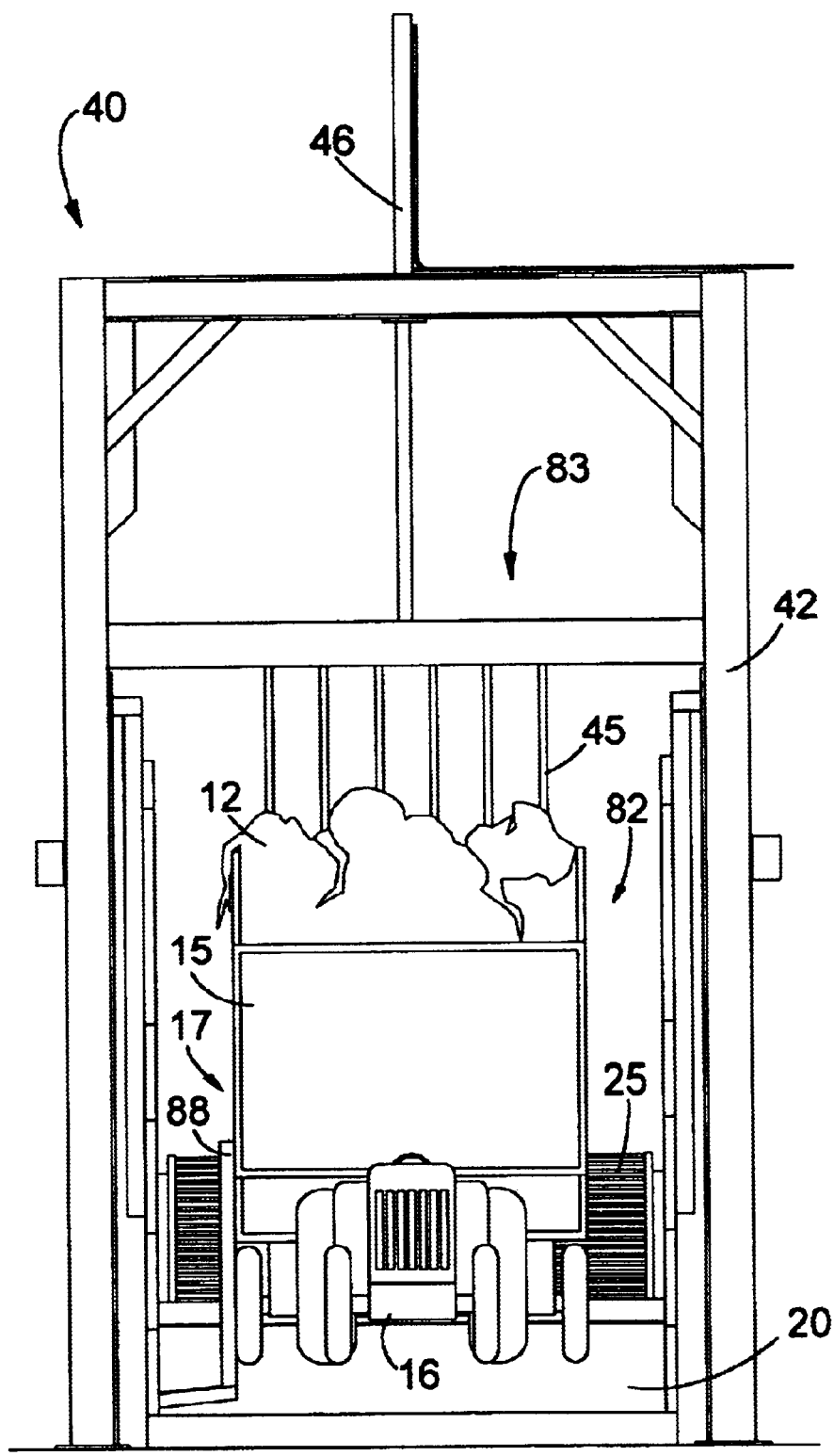
FIG. 5C is an end view of a hop vine processor, according to an embodiment of the invention.
Figure 5D:
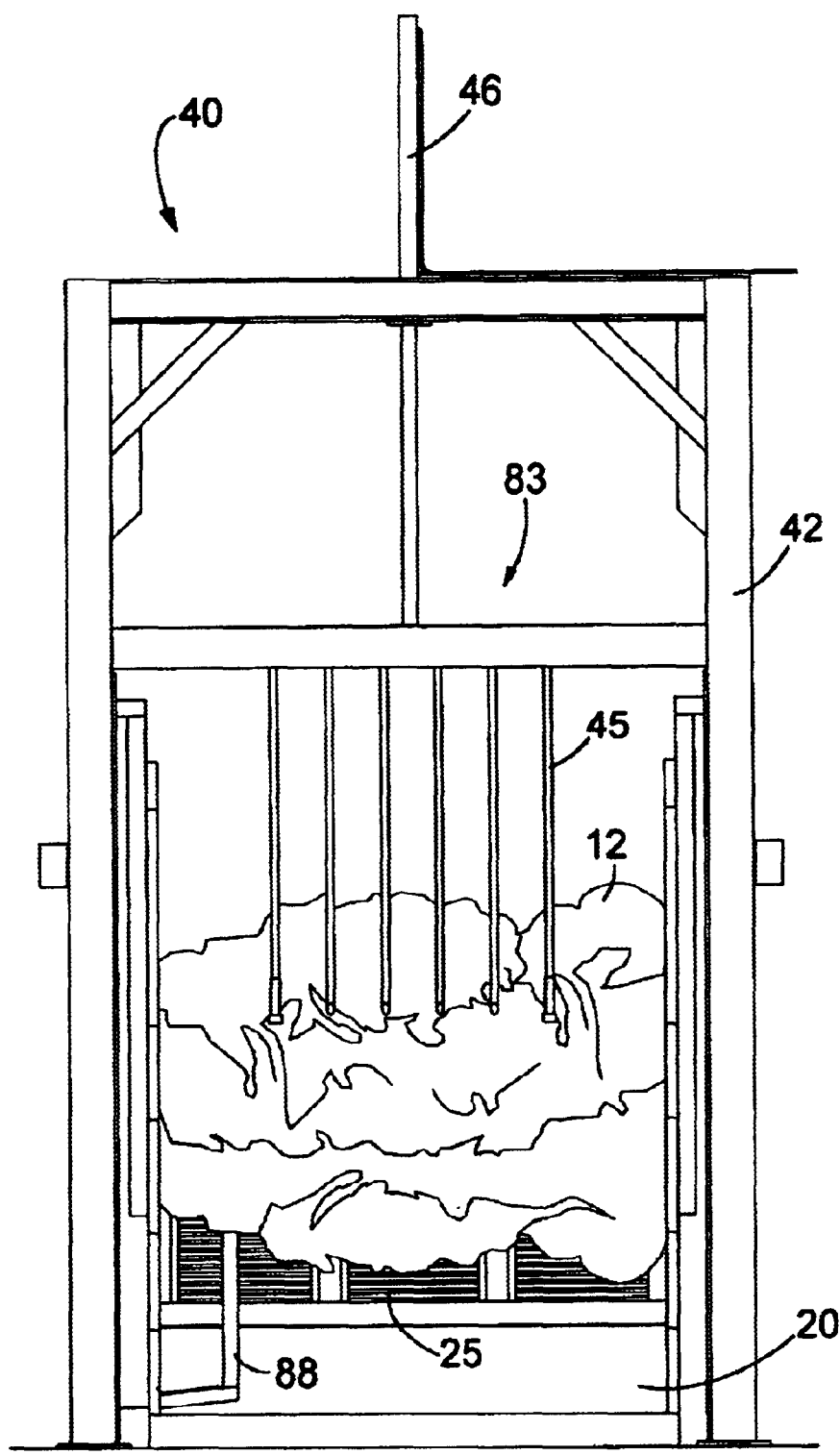
FIG. 5D is an end view of a hop vine processor, according to an embodiment of the invention.
Figure 5E:
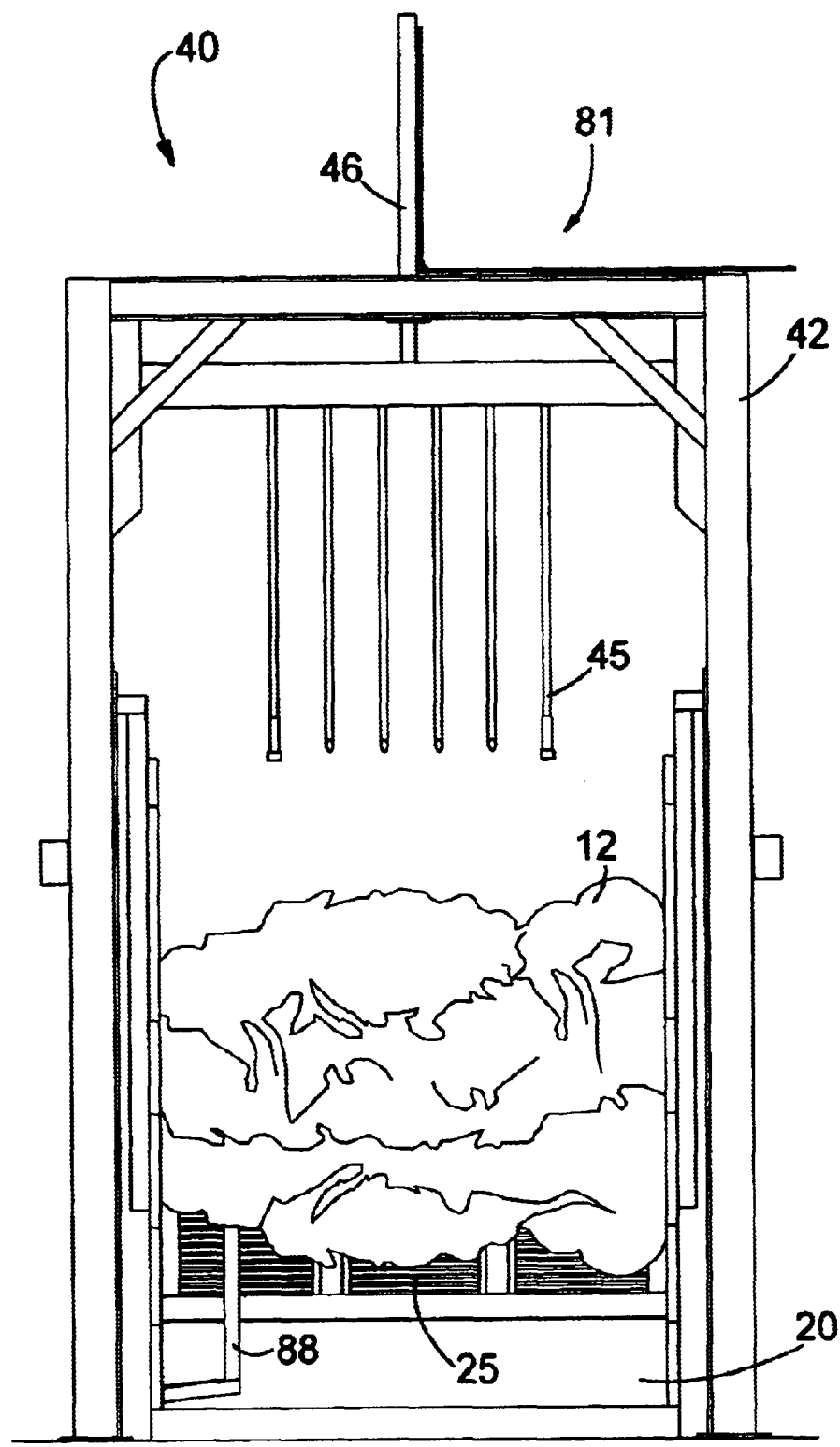
FIG. 5E is an end view of a hop vine processor, according to an embodiment of the invention.
Figure 5F:
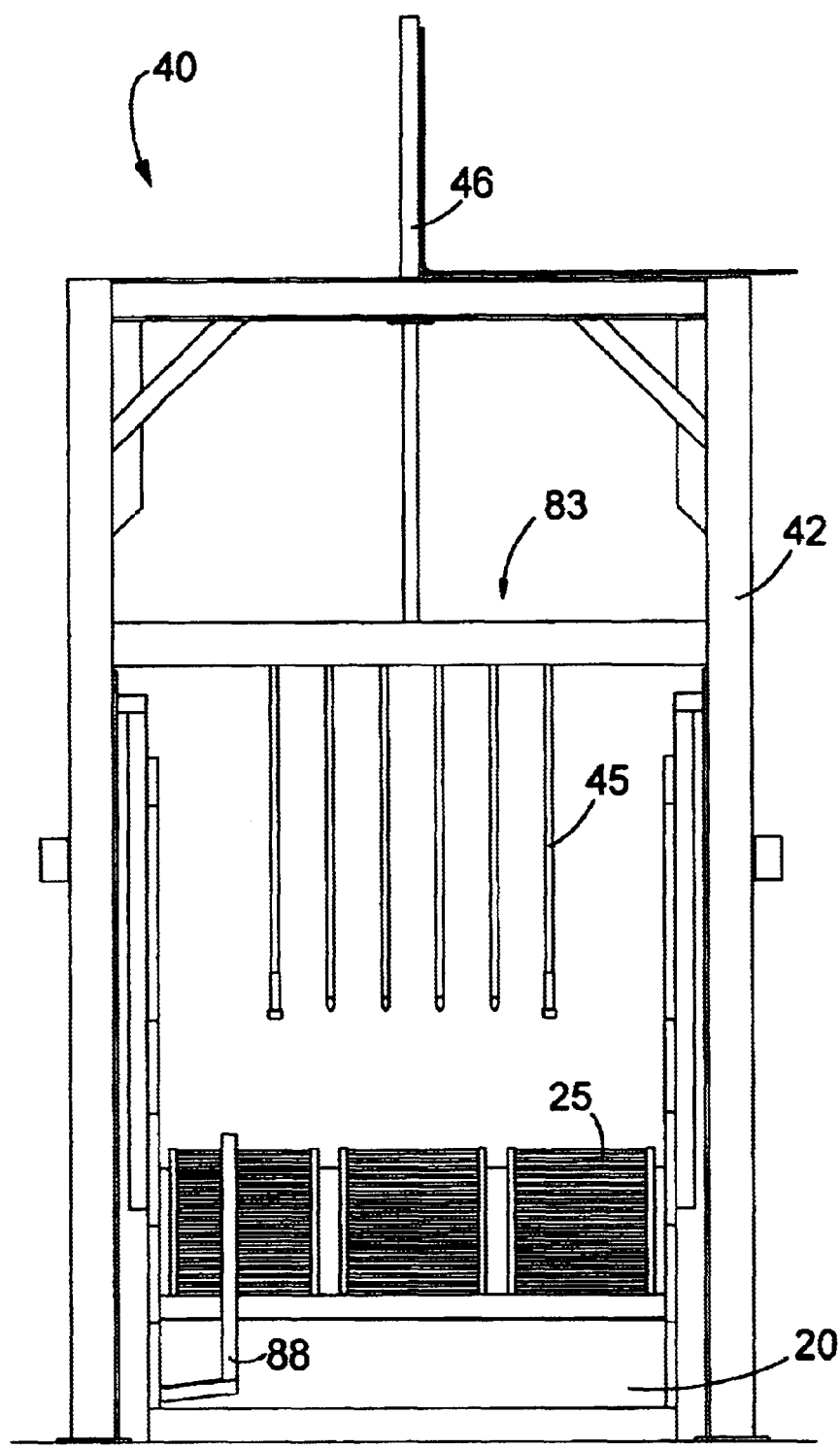
FIG. 5F is an end view of a hop vine processor, according to an embodiment of the invention.

Preferably, after positioning the transport 17 on the infeed conveyor 25, a transport sensor 109 is employed to verify of proper position of the transport 110. The transport sensor is most preferably a conventional electric eye that emits a focused light beam across the infeed conveyor. If the transport is positioned properly, as verified by the transport sensor, the set of removal forks are inserted into transport 112, with the bulk of hop vines 12 contained within the transport. The fork actuator 46 moves the fork 45 within the fork ftame 42 to a lowered position 83, as shown in FIG. 5C. After inserting the fork into the bulk of hop vines, the transport moves off the infeed conveyor 114, while the fork holds the bulk of hop vines in place. Removing the transport pulls the bulk of hop vines off of the trailer and onto the infeed conveyor, as shown in FIG. 5D. The fork is removed from the bulk of hop vines 116, by raising the fork back to the raised position 81, as shown in FIG. 5E. After the fork is removed, the bulk of hop vines are free to move on the infeed conveyor to the cutter 50. The hop vines move on the infeed conveyor to the cutter 120. As a safety measure, before activating the infeed conveyor, the transport sensor is preferably checked, to verify the transport is clear of the infeed conveyor 122. Activation of the infeed conveyor 124 brings the hop vines into position for cutting. The infeed conveyor stops when the bulk of the hop vines are in position for cutting 132. Stopping the infeed conveyor is preferably accomplished by the utilization of a cutting sensor 133, as shown in FIGS. 3B1, 3B2, 7, 8A, 8B, and 8C. The cutting sensor is most preferably a conventional electric eye, like the transport sensor. The cutting sensor emits a focused light beam across the infeed conveyor discharge end 28 of the infeed conveyor and is positioned directly above the shredding conveyor 60. With the infeed conveyor, the bulk of hop vines are moved to a cutting position 80, as shown in FIGS. 6A, 6B, 6C 8A, 8B and 8C. Alternatively, the cutting of the hop vines can be controlled to occur only after verification that the shredding conveyor 60, below the infeed conveyor 25, is cleared of the cut hop vines 134. This verification of the clear shredding conveyor is preferably accomplished with the use of a shredder sensor 135, as also shown in FIGS. 3B1 and 7. Cutting the hop vines 136 is performed by he cutter 50. After cutting the bulk of hop vines across the cutting plane 57, the cut hop vines 58 drop to the shredding conveyor 138. The cut hop vines move on the shredding conveyor to a shredder 70, where shredding 103 processes the cut hop vines to form a cut and shredded hop vine. Most preferably, the shredding conveyor activates only after verification that the shredding conveyer has received hop vines 142. This verification that the shredding conveyor has received hop vines is preferably accomplished with the use of the shredder sensor. After verification that cut hops are present on the shredding conveyor, the shredding conveyor is activated 144. The outfeed chute 77, positioned proximate the rotating mechanism 72 of the shredder receives the cut and shredded hop vine 85, as shown in FIG. 3C. After the cut hop vines are shredded 146, the cut and shredded hop vines drop into the out feed chute 148. The cut and shredded hop vine includes hop cones and hop vine silage. In a preferred alternative method of the present invention the out feed chute drops to an out feed transfer system, which transports the cut and shredded hop vines to a separation 150. The out feed transfer system can include an endless belt conveyor or an auger. Preferably, the separation is a conventional process, well known in hop processing, in which hop vines are separated into hop cones and hop vine silage.

In an alternative embodiment of the present invention, additional sensors can be employed to further automate the method of the hop vine processor 10. An infeed hop sensor 153, preferably positioned proximate to the infeed conveyor discharge end 28 of the infeed conveyor 25 as shown in FIGS. 4B1 and 4B2, can be utilized to prevent the received bulk of hop vines 12 from undesirably building up on the infeed conveyor. Once the infeed hop sensor establishes that the bulk of hop vines are present, a cut hop sensor 133, as shown in FIGS. 3B1, 3B2 and 7, can also be employed to verify that no cut hop vines 58 are present at the shredder conveyor receiving end 66.

It is conceived that other sensors and safeties can also be utilized in the present invention, as needed or required for improved automation and safety. For example a transport light 158, as shown in FIGS. 3A and 4A can be used to indicate to the driver of the transport that the transport 17, namely the trailer 15 is in proper position on the infeed conveyor 25, or that the forks are in the lowered position 83 and the transport may be removed from the infeed conveyor.

Alternatively, any transport 17 with the ability to hold and move the freshly harvested bulk of hop vines 12 and present them to the infeed conveyor 25, can be utilized with the present invention. Although the use of the fork mechanism 40 is preferred, conventional emptying or material removal techniques, such as dumping or tipping mechanisms could be employed with the present invention.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

What is claimed is:

1. A method for processing hop vines comprising the steps of:
   a) off-loading a bulk of hop vines onto an infeed conveyor;
   b) positioning a transport on a infeed conveyor, the transport including a bulk of hop vines;
   c) inserting a fork into the bulk of hop vines contained within the transport, the fork mounted within a fork frame, and the fork operated by a fork actuator to reciprocally travel from a removed position to an inserted position;
   d) moving the transport off of the infeed conveyor;
   e) removing the fork from the bulk of hop vines;
   f) moving the bulk of hop vines to a cutting position with the infeed conveyor;
   g) cutting the bulk of hop vines across a cutting plane;
   h) dropping the cut hop vines to a shredding conveyor;
   i) moving the bulk of hop vines to a shredder with the shredding conveyor; and
   j) shredding the cut hop vine to form a cut and shredded hop vine.

2. A method for processing hop vines comprising the steps of:
   a) off-loading a bulk of hop vines onto an infeed conveyor;
   b) activating the infeed conveyor to move the bulk of hop vines into a cutting position;
   c) moving the bulk of hop vines to a cutting position with the infeed conveyor;
   d) halting the infeed conveyor when hop vines are in position for cutting;
   e) cutting the bulk of hop vines across a cutting plane;
   f) dropping the cut hop vines to a shredding conveyor;
   g) moving the bulk of hop vines to a shredder with the shredding conveyor; and
   h) shredding the cut hop vine to form a cut and shredded hop vine.

3. A method for processing hop vines comprising the steps of:
   a) off-loading a bulk of hop vines onto an infeed conveyor;
   b) moving the bulk of hop vines to a cutting position with the infeed conveyor;
   c) cutting the bulk of hop vines across a cutting plane;
   d) dropping the cut hop vines to a shredding conveyor;
   e) moving the bulk of hop vines to a shredder with the shredding conveyor;
   f) shredding the cut hop vine to form a cut and shredded hop vine;
   g) dropping the cut and shredded hop vine onto a separation conveyor, the cut shredded hop vine including a plurality of hop cones and a hop vine silage; and
   h) separating the cut and shredded hop into the plurality of hop cones and the hop vine silage.

4. A method for processing hop vines comprising the steps of:
   a) off-loading a bulk of hop vines onto an infeed conveyor;
   b) positioning a transport on a infeed conveyor, the transport including a bulk of hop vines;
   c) inserting a fork into the bulk of hop vines contained within the transport, the fork mounted within a fork frame, and the fork operated by a fork actuator to reciprocally travel from a removed position to an inserted position;
   d) moving the transport off of the infeed conveyor;
   e) removing the fork from the bulk of hop vines;
   f) moving the bulk of hop vines to a cutting position with the infeed conveyor;
   g) cutting the bulk of hop vines across a cutting plane;
   h) dropping the cut hop vines to a shredding conveyor;
   i) moving the bulk of hop vines to a shredder with the shredding conveyor; and
   j) shredding the cut hop vine to form a cut and shredded hop vine.

5. The method for processing hop vines of claim 4, wherein the step of moving the bulk of hop vines to a cutting position with the infeed conveyor includes:
   f1) activating the infeed conveyor to move the bulk of hop vines into a cutting position; and
   f2) halting the infeed conveyor when hop vines are in position for cutting.

6. A hop vine processor apparatus comprising:
   an infeed conveyor having an infeed conveyor receiving end and an infeed conveyor discharge end, the infeed conveyor for receiving a bulk of hop vines proximate the infeed conveyor receiving end, and the infeed conveyor for moving the bulk of hop vines to a cutter, the cutter located proximate to the infeed conveyor discharge end;

the cutter including a carriage mounted to a cutting blade, the carriage for moving across the bulk of hop vines to present the cutting blade to the bulk of hop vines along a cutting plane, and the cutting blade for cutting the bulk hop vines across the cutting plane to form a cut hop vine;

a shredding conveyor for receiving the cut hop vine, the shredding conveyor having a shredding conveyor receiving end and a shredding conveyor discharge end, the cut hop vine received onto the shredding conveyor proximate to the shredding conveyor receiving end and moved to the shredding conveyor discharge end; and a shredder for shredding the cut hop vine, the shredder positioned proximate to the shredding conveyor discharge end.

7. The hop vine processing hop apparatus of claim 6, further comprising:

a fork insertable into the bulk of hop vines contained within the transport, the fork mounted within a fork frame, and the fork movable from a raised, removed position to a lowered, inserted position; and a fork actuator for moving the fork.

* * * * *